(12) United States Patent
Sproch et al.

(10) Patent No.: US 9,003,348 B2
(45) Date of Patent: *Apr. 7, 2015

(54) PLACING TRANSISTORS IN PROXIMITY TO THROUGH-SILICON VIAS

(71) Applicant: Synopsys, Inc., Mountain View, CA (US)

(72) Inventors: James David Sproch, Monte Sereno, CA (US); Victor Moroz, Saratoga, CA (US); Xiaopeng Xu, Cupertino, CA (US); Aditya Pradeep Karmarkar, Hyderabad (IN)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/188,532

(22) Filed: Feb. 24, 2014

(65) Prior Publication Data

US 2014/0173545 A1    Jun. 19, 2014

Related U.S. Application Data

(60) Continuation of application No. 13/740,439, filed on Jan. 14, 2013, now Pat. No. 8,661,387, which is a division of application No. 12/430,008, filed on Apr. 24, 2009, now Pat. No. 8,362,622.

(51) Int. Cl.
*G06F 17/50* (2006.01)
*H01L 21/768* (2006.01)
(Continued)

(52) U.S. Cl.
CPC ........ *G06F 17/5009* (2013.01); *G06F 17/5036* (2013.01); *G06F 17/5072* (2013.01);
(Continued)

(58) Field of Classification Search
None
See application file for complete search history.

(56) References Cited

U.S. PATENT DOCUMENTS 6,664,580 B2   12/2003   Jao et al.
6,826,517 B2   11/2004   Okada et al.
(Continued)

FOREIGN PATENT DOCUMENTS

CN    101295693 A    10/2008
CN    101322241 A    12/2008
WO    2007063573 A1   6/2007

OTHER PUBLICATIONS

Kanda, "A Graphical Representation of the Piezoresistance Coefficients in Silicon," IEEE Trans. on Electron Devices, vol. ED-29, No. 1, Jan. 1982, pp. 64-70.

(Continued)

*Primary Examiner* — Leigh Garbowski
(74) *Attorney, Agent, or Firm* — Kenta Suzue; Haynes Beffel & Wolfeld LLP

(57) ABSTRACT

Roughly described, the invention involves ways to characterize, take account of, or take advantage of stresses introduced by TSV's near transistors. The physical relationship between the TSV and nearby transistors can be taken into account when characterizing a circuit. A layout derived without knowledge of the physical relationships between TSV and nearby transistors, can be modified to do so. A macrocell can include both a TSV and nearby transistors, and a simulation model for the macrocell which takes into account physical relationships between the transistors and the TSV. A macrocell can include both a TSV and nearby transistors, one of the transistors being rotated relative to others. An IC can also include a transistor in such proximity to a TSV as to change the carrier mobility in the channel by more than the limit previously thought to define an exclusion zone.

25 Claims, 15 Drawing Sheets

(51) Int. Cl.
*H01L 27/02* (2006.01)
*H01L 29/78* (2006.01)
*H01L 21/8238* (2006.01)

(52) U.S. Cl.
CPC ...... *H01L21/76898* (2013.01); *H01L 27/0207* (2013.01); *H01L 29/7845* (2013.01); *G06F 17/5068* (2013.01); *G06F 2217/12* (2013.01); *G06F 2217/82* (2013.01); *H01L 21/823807* (2013.01); *H01L 2924/0002* (2013.01)

(56) References Cited

U.S. PATENT DOCUMENTS

| | | | |
|---|---|---|---|
| 7,032,194 | B1 | 4/2006 | Hsueh et al. |
| 7,158,401 | B2 | 1/2007 | Bhattacharyya |
| 7,190,036 | B2 | 3/2007 | Ko et al. |
| 7,266,787 | B2 | 9/2007 | Hughes et al. |
| 7,484,198 | B2 | 1/2009 | Lin et al. |
| 7,495,296 | B2 | 2/2009 | Maeda et al. |
| 8,661,387 | B2 | 2/2014 | Sproch et al. |
| 2005/0227440 | A1 | 10/2005 | Ema et al. |
| 2006/0220142 | A1 | 10/2006 | Tamura |
| 2007/0114632 | A1 | 5/2007 | Chidambarrao et al. |
| 2007/0202663 | A1 | 8/2007 | Moroz et al. |
| 2007/0204250 | A1 | 8/2007 | Moroz et al. |
| 2007/0278586 | A1 | 12/2007 | Chen et al. |
| 2008/0220565 | A1 | 9/2008 | Hsu et al. |
| 2008/0265390 | A1 | 10/2008 | Kurita |
| 2009/0070728 | A1 | 3/2009 | Solomon |
| 2009/0091333 | A1 | 4/2009 | Chung et al. |
| 2009/0102021 | A1 | 4/2009 | Chen et al. |
| 2009/0315154 | A1 | 12/2009 | Kirby et al. |
| 2010/0012916 | A1 | 1/2010 | Kuo et al. |
| 2010/0032764 | A1 | 2/2010 | Andry et al. |
| 2010/0052174 | A1 | 3/2010 | Bachman et al. |
| 2010/0093169 | A1 | 4/2010 | Kuo |
| 2010/0130002 | A1 | 5/2010 | Dao et al. |
| 2010/0224876 | A1 | 9/2010 | Zhu |
| 2010/0237472 | A1 | 9/2010 | Gillis et al. |
| 2010/0264477 | A1 | 10/2010 | Schiml et al. |

OTHER PUBLICATIONS

Loke, "Introduction to Deep Submicron CMOS Device Technology", Powerpoint presentation, May 3, 2005, available at http://www.engr.colostate.edu/EE571/Files/2005.sub.--05.sub.--03.sub.--CS-U.pdf, visited Oct. 4, 2007.

P.S. Andry, et al., "A CMOS-compatible Process for Fabricating Electrical Through-vias in Silicon," Proc. 56th Elec. Comp. and Tech. Conf., 2006, pp. 831-837.

B. Vandevelde, et al., "Thermo-mechanics of 3D-Wafer Level and 3D Stacked IC Packaging Technologies" 9th Int. Conf. on Therm., Mech. and Multi-Physics Simulations and Exper. in Microelec. and Micro-Systems, (EuroSimE), 2008, pp. 1-7.

K. Takahashi et al., "Through Silicon Via and 3-D Wafer/Chip Stacking Technology," 2006 Symp. On VLSI Circ., Digest of Technical Papers, 2006, pp. 89-92.

B. Wunderle, et al., "Thermo-Mechanical Reliability of 3D-Integrated Microstructures ininnStacked Silicon," Mater. Res. Soc. Symp. Proc. 970, Warrendale, PA, 2007, 0970-Y02-04.

Tsang C.K. et al., "CMOS-Compatible Through Silicon Vias for 3D Process Integration," Mater. Res. Soc. Symp. Proc. vol. 970, 2007, 9 pp.

Provoost J. et al., "TSV First and Last: Through-Si Via Technologies for 3D SIC and 3D WLP, Part 1," Advanced Packaging, accessed online Jan. 26, 2009 at http://ap.pennnet.com/display.sub.--article/349289/36/ARTCL/none/-none/1/TSV-First-and-Last:-Through-Si-Via-Technologies-for-3D-SIC-and-3D-W- LP, 4 pp.

Smith C.S., "Piezoresistance Effect in Germanium and Silicon," Physical Review vol. 94(1), Apr. 1954, 4 pp.

International Search Report mailed Nov. 12, 2010 in PCT/US2010/029326.

Newman, M.W., "Fabricationand Electrical Characterization of 3D Vertical Interconnects," IEEE Electronics Components and Technology Conference (2006), pp. 394-398.

Chukwudi Okoro et al., "Analysis of the Induced Stresses in Silicon During Thermcompression Cu—Cu Bonding of Cu-Through-Vias in 3D-SIC Architecture," IEEE 2007 Electronic Components and Technology Conference, pp. 249-255.

Office action mailed Apr. 23, 2013 in related application CN 201080017985.9, 11pp including translation.

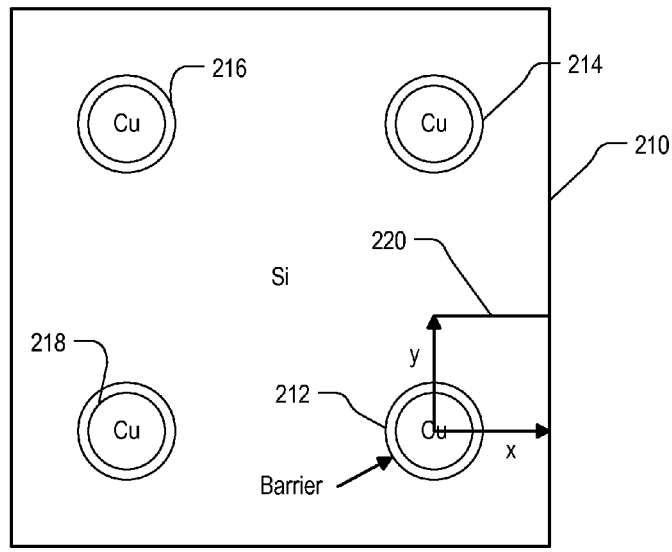
FIG. 2A
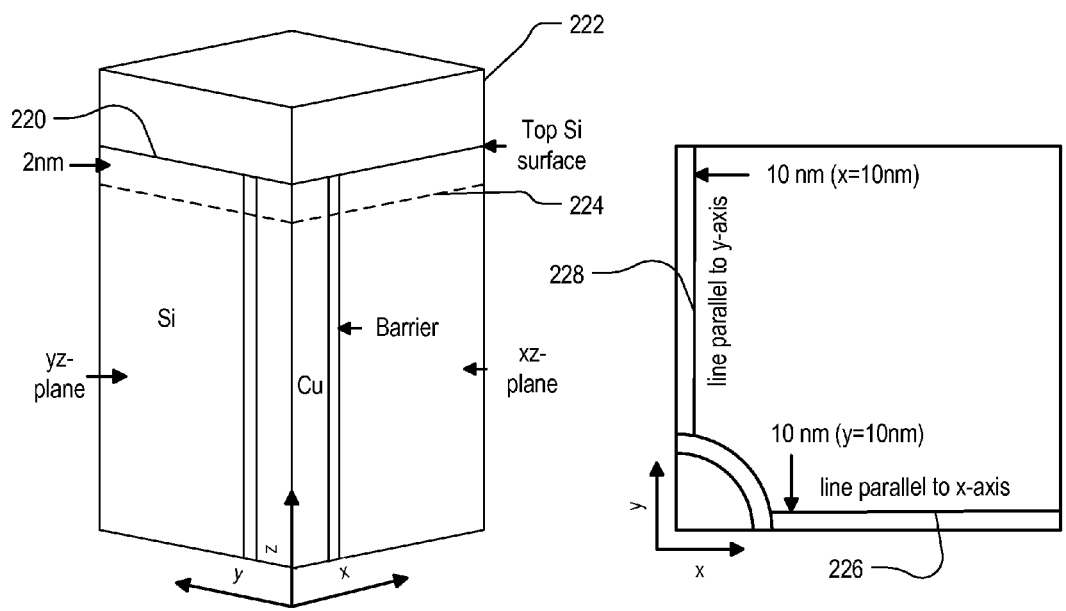
FIG. 2B
FIG. 2C distance in x-direction along line 226 (nm)

distance in y-direction along line 228 (nm)

PLACING TRANSISTORS IN PROXIMITY TO THROUGH-SILICON VIAS

RELATED APPLICATIONS

This application is a continuation of U.S. patent application Ser. No. 13/740,439, filed 14 Jan. 2013, which is a divisional of U.S. application Ser. No. 12/430,008, filed 24 Apr. 2009 entitled Method and Apparatus for Placing Transistors in Proximity to Through-Silicon Vias, which are incorporated herein by reference.

BACKGROUND

The present invention relates to methods and systems for improving integrated circuit performance through stress-engineering of the layout relative to through-silicon vias, and articles manufactured thereby.

It has long been known that semiconductor materials such as silicon and germanium exhibit the piezoresistance effect (mechanical stress-induced changes in electrical resistance). See for example C. S. Smith, "Piezoresistance effect in germanium and silicon", Phys. Rev., vol. 94, pp. 42-49 (1954), incorporated by reference herein. The piezoresistance effect has formed the basis for certain kinds of pressure sensors and strain gauges, but only recently has it received attention in the manufacture of integrated circuits.

Methods have been developed to model the impact of stress on the behavior of integrated circuit devices at the level of individual transistors. These methods include, for example, full-scale analysis with a Technology Computer Aided Design (TCAD) system; and a method described in U.S. patent application Ser. No. 11/291,294, filed Dec. 1, 2005, incorporated herein by reference.

Behaviors characterized by the various methods for analyzing stress impact at the level of individual transistors can be used to derive circuit level parameters (e.g. SPICE parameters) of the device for subsequent analysis of the circuit at macroscopic levels. Such analysis can help predict whether the circuit will operate as intended, and with what margins, or whether the design or layout needs to be revised. For transistors affected by stress caused by shallow trench isolation (STI) regions in proximity to transistor channel regions, revisions can often be made by applying certain general rules-of-thumb, such as increasing the width of any transistor that, according to the stress analysis, turns out to be weaker than expected. Other techniques can also be used to relax known undesirable stress, to introduce known desirable stress, or merely to improve uniformity throughout the layout. See U.S. Patent Publication No. 2007-0202663, incorporated herein by reference.

As integrated circuit scaling becomes increasingly difficult with each technology node, three-dimensional (3D) integration technologies have emerged as viable alternatives to achieve the requisite integration densities. 3D integration improves system performance and allows heterogeneous integration of circuit blocks. Many 3D integration techniques include vertical interconnects using through-silicon vias (TSVs). These structures are complex geometries consisting of various materials with widely varying mechanical properties. During the manufacturing process, these geometries undergo thermal cycling that introduces thermo-mechanical stresses in the surrounding silicon. The TSVs also introduce thermal mismatch stresses in the active silicon and affect the carrier mobility. A typical response to these stresses is to define an exclusion zone around them, and to avoid placing transistors within the exclusion zones. There may be numerous TSVs in a particular layout, however, and avoiding the regions surrounding them can significantly reduce the amount of space available for the integrated circuit.

SUMMARY

An opportunity arises to create robust designs that take the above stresses into account in the layout of integrated circuit designs. Better, denser, and more powerful circuits, components and systems may result.

Roughly described, the invention involves ways to characterize, take account of, or take advantage of stresses introduced by the proximity of transistors to a TSV. In one aspect, the distance, angular displacement and/or orientation of transistors relative to a TSV are taken into account when characterizing a circuit. In another aspect, a circuit layout derived without taking into account the physical relationships between transistors and nearby TSVs, is modified to do so. In another aspect, a macrocell includes both a TSV and nearby transistors of a circuit, and a simulation model is provided for the macrocell which takes into account the physical relationships between the transistors and the TSV. In another aspect, a macrocell includes both a TSV and nearby transistors of a circuit, and at least one of the transistors is rotated relative to others of the transistors. In another aspect, an IC includes a transistor in such proximity to a TSV as to change the carrier mobility in the channel by more than the limit previously thought to define an exclusion zone. In another aspect, an IC includes a transistor in such proximity to a TSV as to change the switching speed of the transistor by more than the switching speed design margin.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIG. 2A is a plan view of a simplified structure of a region of a silicon substrate containing four TSVs FIG. 2B is perspective view of the three-dimensional volume below the box 220 in FIG. 2A.

FIG. 2C is a plan view of an xy-plane in the volume of FIG. 2A, as indicated by broken lines 224 in FIG. 2B.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
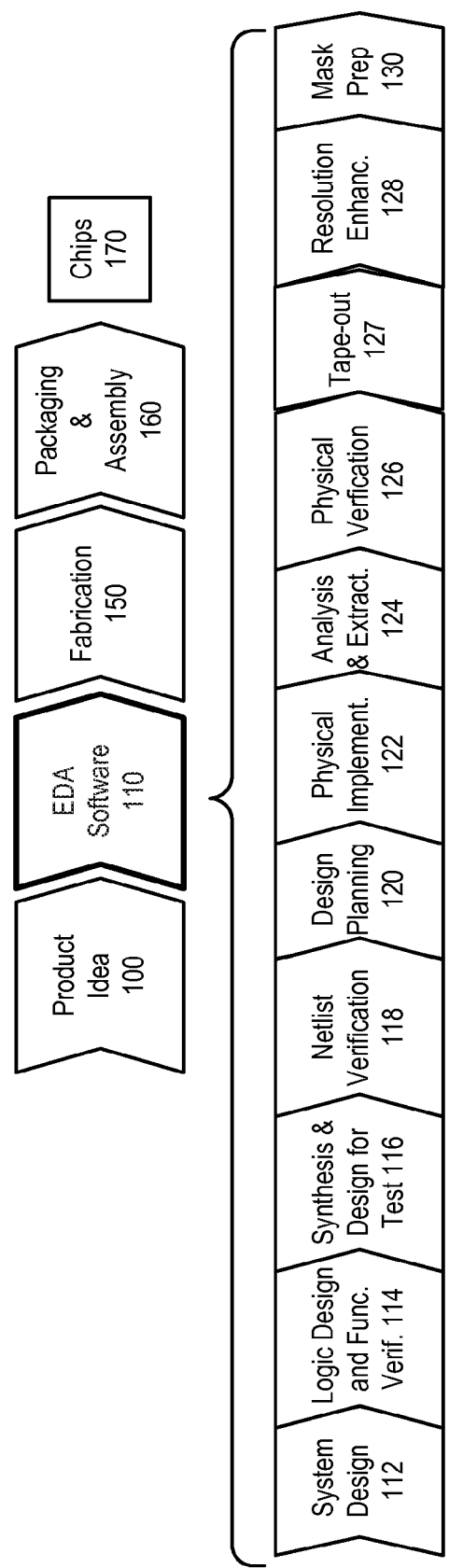
FIG. 1 shows a simplified representation of an illustrative digital integrated circuit design flow incorporating features of the invention.

FIG. 1 shows a simplified representation of an illustrative digital integrated circuit design flow. At a high level, the process starts with the product idea (step 100) and is realized in an EDA (Electronic Design Automation) software design process (step 110). When the design is finalized, it can be taped-out (step 127). After tape out, the fabrication process (step 150) and packaging and assembly processes (step 160) occur resulting, ultimately, in finished integrated circuit chips (result 170).

The EDA software design process (step 110) is actually composed of a number of steps 112-130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA software design process (step 110) will now be provided.

System design (step 112): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 114): At this stage, the VHDL or Verilog code for modules in the system is written and the design is checked for functional accuracy. More specifically, the design is checked to ensure that it produces correct outputs in response to particular input stimuli. Example EDA software products from Synopsys, Inc. that can be used at this step include VCS, VERA, DesignWare®, Magellan, Formality, ESP and LEDA products.

Synthesis and design for test (step 116): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, DFT Compiler, Power Compiler, FPGA Compiler, TetraMAX, and DesignWare® products.

Netlist verification (step 118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 120): Here, an overall floor plan for the chip is constructed and analyzed for timing and top-level routing. Example EDA software products from Synopsys, Inc. that can be used at this step include Astro and IC Compiler products.

Physical implementation (step 122): The placement (positioning of circuit elements) and routing (connection of the same) occurs at this step. Example EDA software products from Synopsys, Inc. that can be used at this step include the Astro and IC Compiler products.

Analysis and extraction (step 124): At this step, the circuit function is verified at a transistor level, this in turn permits what-if refinement. Example EDA software products from Synopsys, Inc. that can be used at this step include AstroRail, PrimeRail, PrimeTime, and Star-RCXT products.

Physical verification (step 126): At this step various checking functions are performed to ensure correctness for: manufacturing, electrical issues, lithographic issues, and circuitry. Example EDA software products from Synopsys, Inc. that can be used at this step include the Hercules product.

Tape-out (step 127): This step provides the "tape-out" data for production of masks for lithographic use to produce finished chips. Example EDA software products from Synopsys, Inc. that can be used at this step include the CATS(R) family of products.

Resolution enhancement (step 128): This step involves geometric manipulations of the layout to improve manufacturability of the design. Example EDA software products from Synopsys, Inc. that can be used at this step include Proteus, ProteusAF, and PSMGen products.

Mask data preparation (step 130): This step provides the "tape-out" data for production of masks for lithographic use to produce finished chips. Example EDA software products from Synopsys, Inc. that can be used at this step include the CATS(R) family of products.

Stress Consequences of TSVs

The stress consequences of TSVs can vary depending on wafer and lithographic orientation relative to the crystallographic directions of the wafer material. As used herein, a wafer orientation is defined by its normal direction, and currently the {100} family of directions is standard in semiconductor fabrication. Because of crystallographic symmetry, all the specific directions in the {100} family have the same piezoresistance properties. Whereas a family of wafer orientation directions is denoted herein with curly brackets, if a specific direction is referenced herein, it is enclosed in parentheses, such as (100). Also as used herein, a wafer has a "primary flat" direction. Historically, a wafer was generally disc-shaped, except for one section along the circumference which was flat. The "primary flat" direction of a wafer is defined herein as a direction parallel to that flat section. Most modern wafers no longer have flat sections, but rather use some other feature (such as a notch) to define the "primary flat" direction; even though there is no longer a flat section, the direction defined by the feature is still referred to herein as the "primary flat direction". Further, most modern lithographic processes orient all transistors such that their longitudinal direction is in the <110> family of crystallographic directions. Typically these directions are parallel to the primary flat direction of the wafer. A transistor oriented in a <110> direction is sometimes referred to herein as having the "standard orientation". Again, as used herein, whereas a family of lithographic orientation directions is denoted with angle brackets, if a specific direction is referenced herein, it is enclosed in square brackets, such as [110]. All the specific directions in the <110> family have the same piezoresistance properties.

FIGS. 2A, 2B and 2C (collectively FIG. 2) illustrate a simplified structure of a region of a silicon substrate 210 containing four TSVs 212, 214, 216 and 218. FIG. 2A is a plan view of the region. In this embodiment, the wafer is oriented in a (001) crystal direction, and the primary flat is oriented parallel to the [110] direction, which is the same as the x axis as shown in the figure. Each TSV is represented in the plan view by a circular copper via surrounded by an SiO2 insulating barrier, although other materials can be used in other embodiments for both the conductor and the insulating barrier. During the process of fabricating a silicon wafer with TSV's, the structure undergoes cooling from a high temperature such as 250 degrees C., down to room temperature (~25 degrees C.). As the structure cools, both the silicon and copper materials shrink, but the copper shrinks more than the silicon. This causes tensile stress in the silicon in a direction normal to the TSV circumference (i.e. radially), which in turn causes compressive stress in the silicon in a direction tangential to the TSV circumference. The magnitudes of the stresses fall off with increasing distance away from the edge of the TSV.

In order to understand the effect of these stresses on carrier mobility (and therefore transistor performance), the stresses can be modeled and analyzed using a finite element method (FEM) based 3D simulator. In some simulations described herein the TSV is copper and in others it is tungsten. In a simplification, reflective boundary conditions are assumed that permit simulating the stress consequences of only one-quarter of one TSV 212, as represented by the box 220. Directions x and y are identified on the lines of box 220. FIG. 2B is a perspective view of the three-dimensional volume below the box 220. This view identifies directions x, y and z. Above the box 220 is a top portion 222, which is a simulated smear material for approximating the mechanical effects of an interconnect structure on top of the wafer with the mechanical properties being derived from those of its constituents. If the TSV pitch is 15 microns, for example, then the TSV diameter might be 3 microns, and the barrier thickness might be 0.18 microns. FIG. 2C is a plan view of a z-normal plane in the structure of FIG. 2B, situated 2 nm below the top silicon surface 220 as indicated by the broken lines 224 in FIG. 2B.

In the simulation, the carrier mobility change in the plane of FIG. 2C is determined for [001] wafer orientation and [110] primary flat orientation. It is found that the carrier mobility variation in the active region of an n-silicon wafer is significantly smaller than that in a p-silicon wafer. It is also found that the carrier mobility change in the active silicon region is much smaller for a tungsten TSV than for a copper TSV.

Figure 3A:
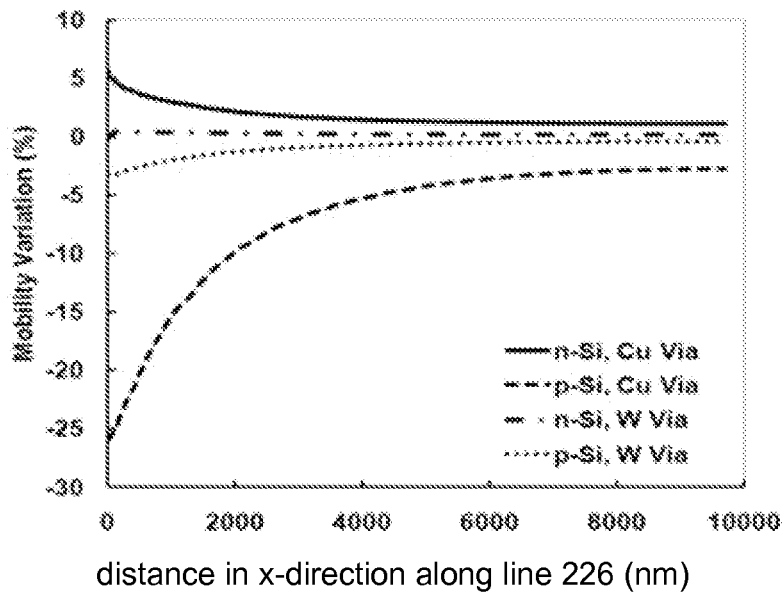
FIG. 3A is a plot of the carrier mobility variation along line 226 in FIG. 2C.
Figure 3B:
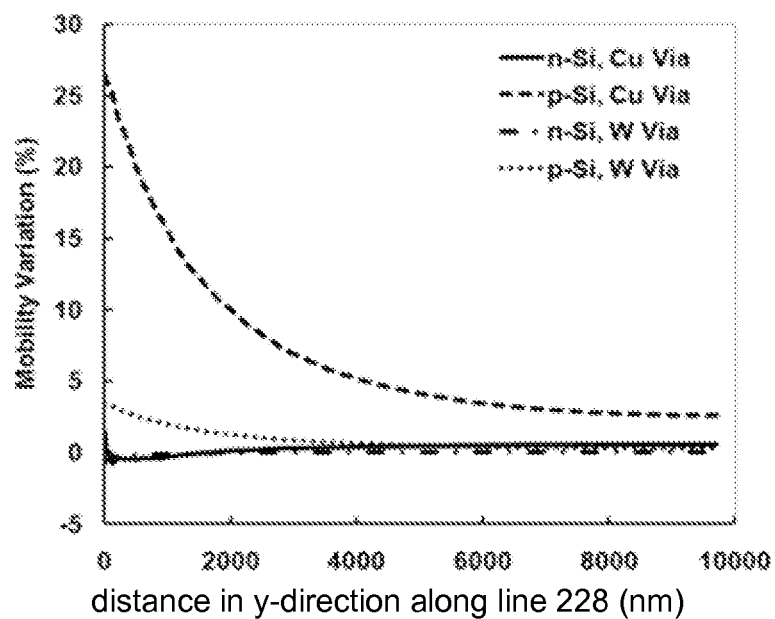
FIG. 3B is a plot of the carrier mobility variation along line 228 in FIG. 2C.

FIG. 3A is a plot of the carrier mobility variation along a line 226 in FIG. 2C, which lies in the z-normal plane of FIG. 2C, and is parallel to the x axis and 10 nm away from the xz plane (i.e., y=10 nm). FIG. 3B is a plot of the carrier mobility variation along a line 228 in FIG. 2C, which lines in the z-normal plane of FIG. 2C, and is parallel to the y axis and 10 nm away from the yz plane (i.e., x=10 nm). Four plots are shown in each figure: one for each combination of n-silicon or p-silicon wafer material, and copper or tungsten TSV material. In both figures the carrier mobility variation is plotted as a function of distance from the barrier edge to a distance of about 10 microns from the barrier edge.

It can be seen that the change in the carrier mobility due to mechanical stress depends on the location. Carrier mobility impact is higher for locations closer to the TSV, and lower for locations father from the TSV. Moreover, the carrier mobility impact is different in n- and p-silicon, different depending on the direction from the TSV, and different depending on the material properties of the TSV. In n-silicon, carrier mobility is affected only slightly in any direction and distance from the TSV. Most significant is the impact that copper TSVs have on carrier mobility in p-silicon. Carrier mobility along the x direction in p-silicon ranges from a decrease of approximately 25% immediately adjacent to the TSV, to a decrease of only 5% at a distance of about 5 microns from the TSV. On the other hand, carrier mobility along the y direction ranges from an increase of approximately 25% immediately adjacent to the TSV, to an increase of only 5% at a distance of about 5 microns from the TSV. Though not shown in FIG. 3A or 3B, simulations also reveal that the change in carrier mobility gradually transitions from negative at the x-axis to positive at the y-axis, along a fixed radius arc centered at the center of the TSV.

Figure 4:
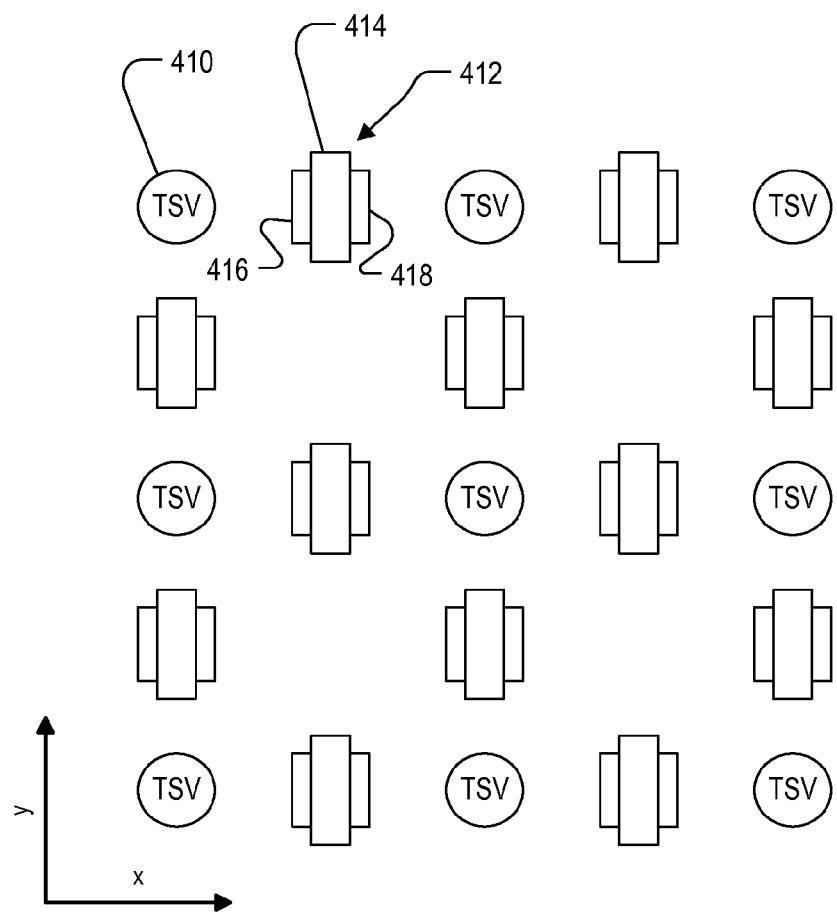
FIGS. 4 and 5 are a plan views of example regions of a silicon substrate.

FIG. 4 is a plan view of an example region of a silicon substrate showing both TSVs and transistors. As used herein, no distinction is intended between substances of an integrated circuit which are disposed in the substrate body itself, or disposed in an overlying layer. For example, all of the features of an integrated circuit, including wells, diffusions, gate conductors and interconnects, are all described equivalently herein as being either "on" the substrate or "in" the substrate, and no distinction is intended between the two words.

Figure 5:
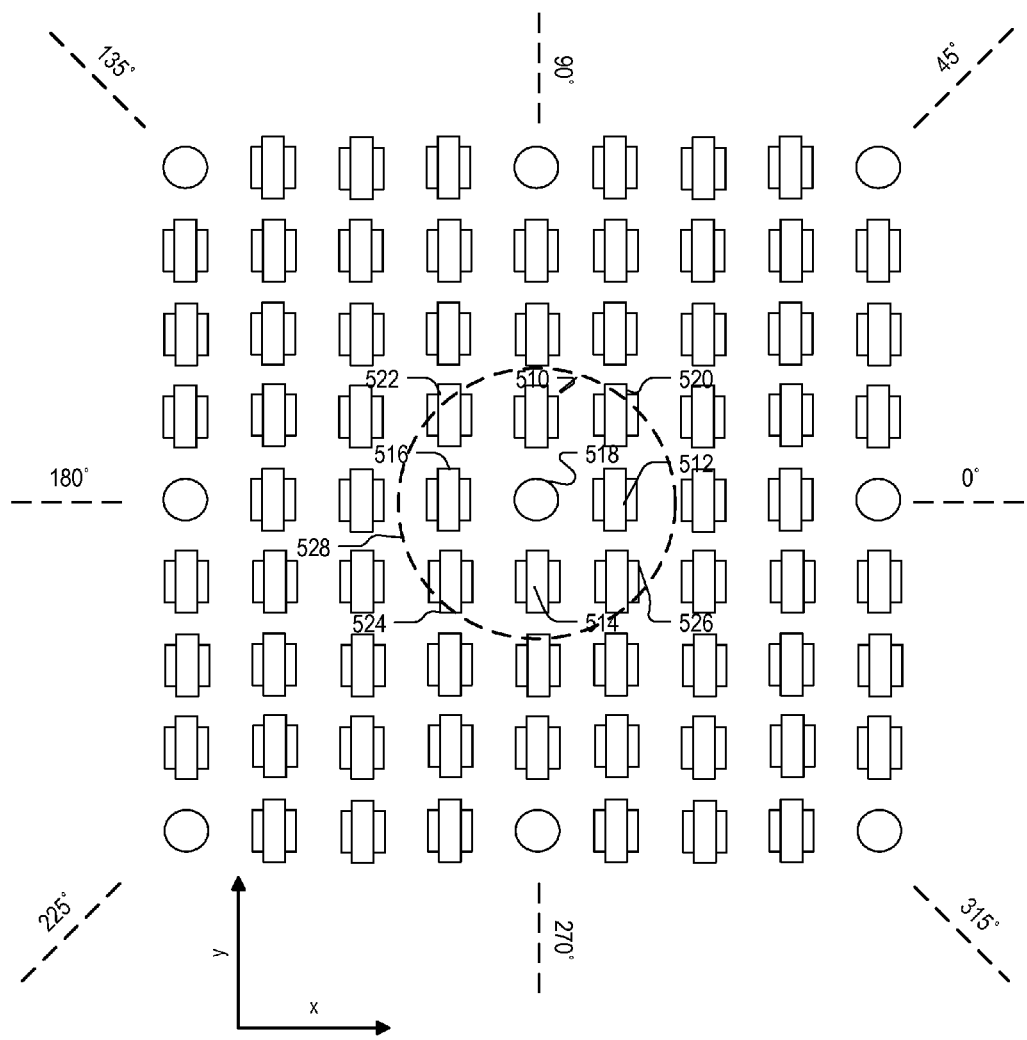

Referring to FIG. 4, each TSV is represented by a circle such as 410, and each transistor such as 412 is represented by a gate stack 414 separating first and second diffusion regions 416 and 418. Depending on the interconnection of the transistors into a circuit, one of the diffusion regions acts as the source of the transistor and the other as the drain. The transistor channel is located below the gate stack. The drawings of FIGS. 4 and 5 are used herein to discuss both n-channel transistors and p-channel transistors, so the type of the transistors in FIGS. 4 and 5 is identified within the context of each discussion herein that refers to them. In FIG. 4, the layout places only one transistor between each pair of TSVs, in both the x and y dimensions. FIG. 5 is a plan view of another example region of a silicon substrate, in which many transistors are located among the TSVs. In both example figures, both the TSVs and the transistors are placed in regular grids. Such regularity might be typical of a highly repetitive circuit like a memory array, but would be atypical of a logic circuit, where transistor placement would appear much more random. Also, in both examples all the diffusion regions have the same width and each pair of diffusion regions is used for only a single transistor. In many layouts, diffusion regions are often shared among more than one transistor, and can have different widths. However, the regular layouts of FIGS. 4 and 5 will serve for the present discussion.

In both the layout examples of FIG. 4 and FIG. 5, all transistors are oriented in the standard direction. This is consistent with modern integrated circuit lithography, at least for digital circuits. Specifically, the transistors are all oriented such that their longitudinal direction coincides with the x dimension of the substrate. As used herein, the orientation of a transistor is considered to be the orientation of its "longitudinal" direction, which in turn is considered herein to be the direction of current flow from source to drain when the transistor is turned on. The "transverse" direction is perpendicular to the longitudinal direction, and perpendicular to the direction of current flow. Both the longitudinal and transverse directions of the transistor are considered herein to be "lateral" directions, meaning a direction that is parallel to the surface of the substrate. Other "lateral" directions include those (not shown) which are parallel to the surface but intersect both the transverse and longitudinal directions at angles. The "vertical" direction is normal to the surface of the channel and therefore perpendicular to all possible lateral directions. The "length" of a structure in a layout, as used herein, is its length in the longitudinal direction, and its "width" is its width in the transverse direction. It can be seen from the layout of transistor 412 that the length of its channel is significantly shorter than its width, which is typical for transistors that are used in logic circuits. Also shown in FIGS. 4 and 5 are the x and y coordinate axes.

It can be seen that in the layouts of FIGS. 4 and 5, different transistors will be affected differently depending on both their distance from nearby TSVs, and also their angular position on a polar coordinate system centered at the center of the TSV. Because the effect on mobility can be significant very close to the TSV, the prior art generally prescribes a "keep-away zone", or "exclusion zone", within which transistor placement is to be avoided. For example, in Vandevelde et al., "Thermo-mechanics of 3D-Wafer Level and 3D Stacked IC Packaging Technologies" 9th Int. Conf. on Therm., Mech. and Multi-Physics Simulations and Exper. in Microelec. and Micro-Systems, (EuroSimE), 2008, pp. 1-7, incorporated herein by reference, the keep-away zone is prescribed separately for p-channel and n-channel transistors, and separately for transistor current direction positions parallel and transverse to the [110] crystal direction. The keep-away zone appears to be defined as a circle centered at the center of the TSV, and having a radius equal to the largest distance (over all angular positions) from the center of the TSV at which the mobility change exceeds 5% in magnitude. For the particular materials studied by Vandevelde et. al., the keep-away zone for p-channel transistors was found to range from about 2 microns for a 1.5 micron radius copper TSV to about 9 microns for a 4-micron radius copper TSV. For n-channel transistors the keep-away zone was found to range from about 4 microns for a 3 micron radius copper TSV to about 6.5 microns for a 5 micron copper TSV. Vandevelde would allow disposing n-channel transistors immediately adjacent to the TSV for copper TSVs having a radius of 2.5 microns or less. In FIG. 5, the prior-art defined keep-away zone for TSV 518 is shown illustratively with dashed line 528.

However, as can be seen from FIGS. 3A and 3B, whereas carrier mobility is significantly degraded for standard orientation p-channel transistors lying along the x-axis relative to a TSV and close to it, mobility is significantly enhanced if the p-channel transistor lies along the y-axis relative to the TSV. Therefore, assuming the transistors in FIG. 5 are p-channel transistors, transistors 510 and 514 are significantly enhanced whereas transistors 512 and 516 are significantly degraded. Transistors 520, 522, 524 and 526 are not affected significantly by the stresses caused by the TSV, because they lie at angular positions of 45, 135, 225 and 315 degrees from the x axis relative to the TSV 518, where the change in mobility introduced by the TSV is nearly zero. In fact, even at a radius just beyond the edge of the TSV, the mobility change is either positive or no more than 5% negative, for angular positions that exceed about 45 degrees from the x axis (± about 8 degrees depending on materials and size of the TSV). Thus there is no reason to exclude p-channel transistors from the prior art defined "keep-away" radius if they are located at angular positions sufficiently far from the x axis. And it can actually be advantageous to locate p-channel transistors within this radius if they are located on or close to the y-axis. In an aspect of the invention, therefore, standard orientation p-channel transistors are located at angular positions that deviate from the x axis by more than 53 degrees (45 degrees plus 8 degrees), at distances closer to the TSV than the largest distance (over all angular positions) from the center of the TSV at which the mobility change exceeds 5% in magnitude. In FIG. 5, these include p-channel transistors placed at positions 510, 514, 520, 522, 524, and 526. As used herein, the position of a transistor for purposes of determining its distance from a TSV or its angular displacement from an axis, is considered to be the position of the center of the transistor's channel region.

The effect on mobility is smaller for n-channel transistors, but as mentioned, the prior art still prescribes a keep-away zone for some materials and material sizes. Again, the keep-away zone is a circle having a radius equal to the largest distance (over all angular positions) from the center of the TSV at which the mobility change exceeds 5% in magnitude. Similarly as for p-channel transistors, therefore, in another aspect of the invention, standard orientation n-channel transistors are located at angular positions that deviate from the y axis by more than 53 degrees (45 degrees plus 8 degrees), at distances closer to the TSV than the largest distance (over all angular positions) from the center of the TSV at which the mobility change exceeds 5% in magnitude. In FIG. 5, these include n-channel transistors placed at positions 512, 516, 520, 522, 524, and 526.

Moreover, whereas compressive stress degrades carrier mobility in p-channel transistors if the stress is oriented transversely to the transistor channel, it enhances carrier mobility if the stress is oriented longitudinally to the transistor channel. Therefore, since the radial stress component introduced by a TSV is tensile and the tangential stress component introduced by a TSV is compressive, in an aspect of the invention, p-channel transistors near a TSV are rotated in the xy plane such that their longitudinal directions coincide with the tangential direction of the TSV. As a specific case of this, p-channel transistors located along the x axis relative to a TSV, are rotated 90 degrees so as to be oriented transversely to the radial stress component. This can be seen in FIG. 6, where transistors 512 and 516 have been rotated 90 degrees. The same 90 degree rotation can be made for p-channel transistors located between 315 degrees and 45 degrees or between 135 degrees and 225 degrees on the polar coordinate system, and some performance enhancement will be obtained. The performance enhancement from the rotation is greatest for transistors located within the so-called keep-away zone defined above, but can still have some benefit outside that zone.

Note that transistor orientations transverse to the standard orientation are not supported in all modern CAD software tools, and transistor orientations at ±45 degrees to the standard orientation are supported in fewer CAD software tools still. Even fewer CAD software tools support transistor orientations that are not integer multiples of ±45 degrees to the standard orientation. Therefore, as used herein, a transistor is oriented "substantially tangentially" to a TSV if it is oriented at the angle that is closest to the tangential orientation that is supported by the software.

Still further, the regions surrounding a TSV do not need to be avoided even for those transistors whose mobility degrades. For a given stress distribution and crystallographic orientation, the impact on transistor performance is characterizable. So long as the mobility change can be characterized, such transistors can still be successfully incorporated into a design. It is yet a further aspect of the invention, therefore, to include both n- and p-channel transistors in close proximity to a TSV even at distances, orientations and angular locations at which their mobility degrades.

Typically, circuit designers design logic circuits with a predetermined margin for switching speed, and design memory circuits with a predetermined margin for retrieval speed. Those margins translate to specific percentage deviations in mobility from the nominal, and therefore, based on an exclusion region philosophy, would counsel against disposing transistors in sufficient proximity to a TSV where the mobility changes by more than those specific percentage deviations. But since mobility changes can be characterized, it is yet a further aspect of the invention, to include n- and p-channel transistors sufficiently closely to a TSV that the mobility change exceeds those specific percentage deviations. Said another way, it is an aspect of the invention to include n- and p-channel transistors sufficiently closely to a TSV that the stress induced in the transistor channel by the TSV changes the transistor switching speed by more than the switching speed design margin or the retrieval speed design margin, as the case may be.

Characterization of Transistors Near TSVs

Because the fabrication of prototype integrated circuit designs is expensive and time consuming, it is typical for circuit designers to first simulate their designs using computer simulation tools. In this way corrections can be made before the time and expense of prototype fabrication is incurred. One popular family of circuit simulators, especially useful for analog performance verification and behavior prediction, is known generically as SPICE (Simulation Program with Integrated Circuits Emphasis). The family includes the original SPICE program, numerous subsequent versions of the program, and numerous offshoots available from other sources. Circuit simulators are used often for predicting and verifying, among other things, the steady state analog behavior of a circuit, the transient analog behavior of a circuit, and the RF behavior of a circuit.

Generally, analog circuit simulators operate by describing the circuit in terms of nodes and devices. Each terminal of a device constitutes a node of the circuit. Different nodes can be connected together. Each device is described by a device "model", which either formulaically or algorithmically defines performance measures such as the current/voltage relationships that the device imposes on its terminals. Often a number of different models are available for use in defining the performance measures of a particular kind of device. For example, a large number of models are available to describe a Metal-Oxide-Semiconductor Field-Effect Transistor (MOSFET), some designed for fast computation and others designed for better accuracy and for taking into account particular semiconductor effects. Typically the models require the user to specify values for a number of global parameters that apply to all transistors represented by the model, and optionally also allow the user to specify values for a number of instance parameters that are to apply to only one particular transistor instance. Some models are based on parameter values to be entered explicitly by the user, such as VTO and ION, but most are based on transistor layout characteristics such as channel length and width.

SPICE circuit simulators can perform several types of circuit analyses. Each type of circuit analysis calculates electrical characteristics of the circuit at one or more nodes, given electrical stimuli from one or more circuit devices (such as a time varying voltage or current source). The analysis types include, among others:

Non-linear DC analysis: calculates the DC transfer curve.
Non-linear transient analysis: calculates the voltage and current as a function of time when a large signal is applied.
Linear AC Analysis: calculates the output as a function of frequency. A bode plot is generated.
Noise analysis: calculates noise characteristics
Sensitivity analysis: calculates the sensitivity of one or more electrical characteristics to variations in one or more inputs
Distortion analysis: calculates distortion characteristics at one or more nodes relative to a signal at one or more inputs
Fourier analysis: calculates and plots the frequency spectrum at one or more nodes.

Technology Computer Aided Design (TCAD) models are frequently used to model the behavior of integrated circuit devices at the level of individual transistors. Behaviors characterized at this level can be fed back to improve the circuit layout or the fabrication process, or they can be used to derive circuit level parameters (e.g. SPICE parameters) of the device for subsequent analysis of the circuit at macroscopic levels. TCAD analysis has long been able to take stress effects into account, but only by performing 3-dimensional finite element analysis of a single transistor or a small fragment of the chip. The computation time required to obtain accurate results, however, limited the utility of this kind of analysis to only small regions of a chip layout that include only several transistors. For example, it has not been practical to perform a TCAD analysis to obtain reasonably accurate circuit level parameters for layout regions larger than about a dozen transistors, or about 2-3 diffusion regions. Even then, huge amounts of CPU time, up to several hours per transistor, were required to obtain reasonably accurate results. Even as computing power increases, the required computation time continues to make this approach prohibitively expensive for any large fragments of the chip layout.

The simplified transistor models in SPICE are provided to drastically reduce the computing power necessary to simulate a circuit, for situations in which the accuracy of full finite element analysis is not critical. The simplified models are constantly undergoing improvement, the effort usually being to improve simulation accuracy while continuing to avoid a full finite element analysis. One simplified model that has been developed for taking into account stress effects on electron and hole mobilities is described in R. A. Bianchi et al., "Accurate Modeling of Trench Isolation Induced Mechanical Stress Effects on MOSFET Electrical Performance," IEEE IEDM Tech. Digest, pp. 117 120 (December 2002), and U.S. Patent Publication No. 2002/0173588 (2003), both incorporated herein by reference. A variation of this model, with some additional fitting terms and parameters, was incorporated into Revision 4.3.0 of the Berkeley BSIM standard model. See Xuemei (Jane) Xi, et al., "BSIM4.3.0 Model, Enhancements and Improvements Relative to BSIM4.2.1", University of California at Berkeley (2003), available at http://www.device.eecs.berkeley.edu/~bsim3/BSIM4/BSIM430/doc/BSIM430_Enhancement.pdf (the Length of Diffusion (LOD) model), incorporated by reference herein. Other simplified models have been proposed as well, such as the model described in U.S. patent application Ser. No. 11/291,294, filed 1 Dec. 2005, entitled Analysis Of Stress Impact On Transistor Performance, Attorney Docket No. SYNP 0693-1, incorporated by reference herein.

A large number of transistor models are provided natively with various implementations of SPICE. In addition, most semiconductor fabrication contractors, such as TSMC, provide their customers with a "technology file" that contains hundreds or thousands of different SPICE transistor models for use in different situations. Like the SPICE program itself, the technology file is stored on a computer readable medium for delivery to customers in that form. Alternatively or additionally, the technology file can be transmitted electronically to customers, who then store it on their own computer readable medium. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD-ROMs or a plurality of segments of RAM, or a combination of several different kinds of media.

Existing SPICE transistor models do not take stresses deriving from TSVs into account explicitly. However, it is possible to use a TSV-unaware transistor model with one or more of its device instance parameters modified appropriately in dependence upon the TSV-induced stress in the particular transistor. Many transistor models segregate their input parameters into "global" parameters, applicable to all transistors for which the model is invoked, and "instance" parameters, applicable only to a particular designated transistor or transistors. For some kinds of models, an instance parameter might completely override a corresponding global parameter. That is, if an instance parameter value is specified for a particular transistor, the model performs its calculations using the instance parameter value in place of the value for the corresponding global parameter. For other kinds of models, instance parameters may merely adjust corresponding global parameters. That is, if an instance adjustment parameter value is specified for a particular transistor, the model performs its calculations using the corresponding global parameter value as adjusted by the value specified for the instance parameter. For various parameters in various models, the adjustment may be additive, multiplicative, or may apply in some other way. For example, the instance adjustment parameter DELVTO is additive (adds to the global parameter VTO (zero-bias threshold voltage)), whereas the instance adjustment parameter MULU0 is multiplicative (multiples against the global parameter UO (zero-bias surface mobility coefficient)).

In an aspect of the invention, therefore, a resource is created which estimates the three-dimensional stress distribution around a TSV. The stress at each point can be estimated using a TCAD simulation of the fabrication process flow. The resource stores the stress distribution on a machine readable medium, either in tabular form or formulaically. The resource can later be consulted to determine the TSV-induced stress in the channel of each transistor in proximity to a TSV, and the stress can then be converted using well-known piezoresistance formulae to the required device instance parameter values for that transistor. For example, if the resources specifies the three stress components $\sigma_{xx}$, $\sigma_{yy}$ and $\sigma_{zz}$ at each particular point near the TSV, then a device instance parameter $\mu_{stressed}/\mu_{unstressed}$ can be calculated later for a particular transistor located at the particular point according to the formula $$\mu_{stressed}/\mu_{unstressed} = 1 + p_x\sigma_{xx} + p_y\sigma_{yy} + p_z\sigma_{zz},$$

where $\mu_{stressed}$ is the carrier mobility in the semiconductor under stress ($\sigma_{xx}$, $\sigma_{yy}$ and $\sigma_{zz}$) $\mu_{unstressed}$ is the carrier mobility in stress-free semiconductor, and $p_x$, $p_y$ and $p_z$ are piezo coefficients for the particular semiconductor type, carrier type (holes or electrons) of the particular transistor, and crystallographic orientation of the channel surface and current direction of the particular transistor.

Alternatively, once the stress distribution around a TSV is estimated, the conversion to device instance parameter values can be calculated in advance and stored in the resource. In this case the resource should report device instance parameter values in dependence not only upon position of a transistor relative to the TSV, but also in dependence upon transistor type (p- or n-channel), orientation relative to the TSV, and any other parameter desired (such as crystallographic orientation of the channel surface and current direction of the particular transistor).

In yet another alternative, actual test structures are fabricated using the fabrication process, and their electrical properties measured. After statistical reduction, curve fitting or other numerical modeling techniques are used to express the required device instance parameter values for a transistor located at each point near the TSV. Again, the resource reports device instance parameter values in dependence upon position of a transistor relative to the TSV, transistor type (p- or n-channel), orientation relative to the TSV, and so on, and stores the relationships either in a database or formulaically on a machine readable medium.

Revision of Layout to Take Account of TSV Proximity

Figure 7:
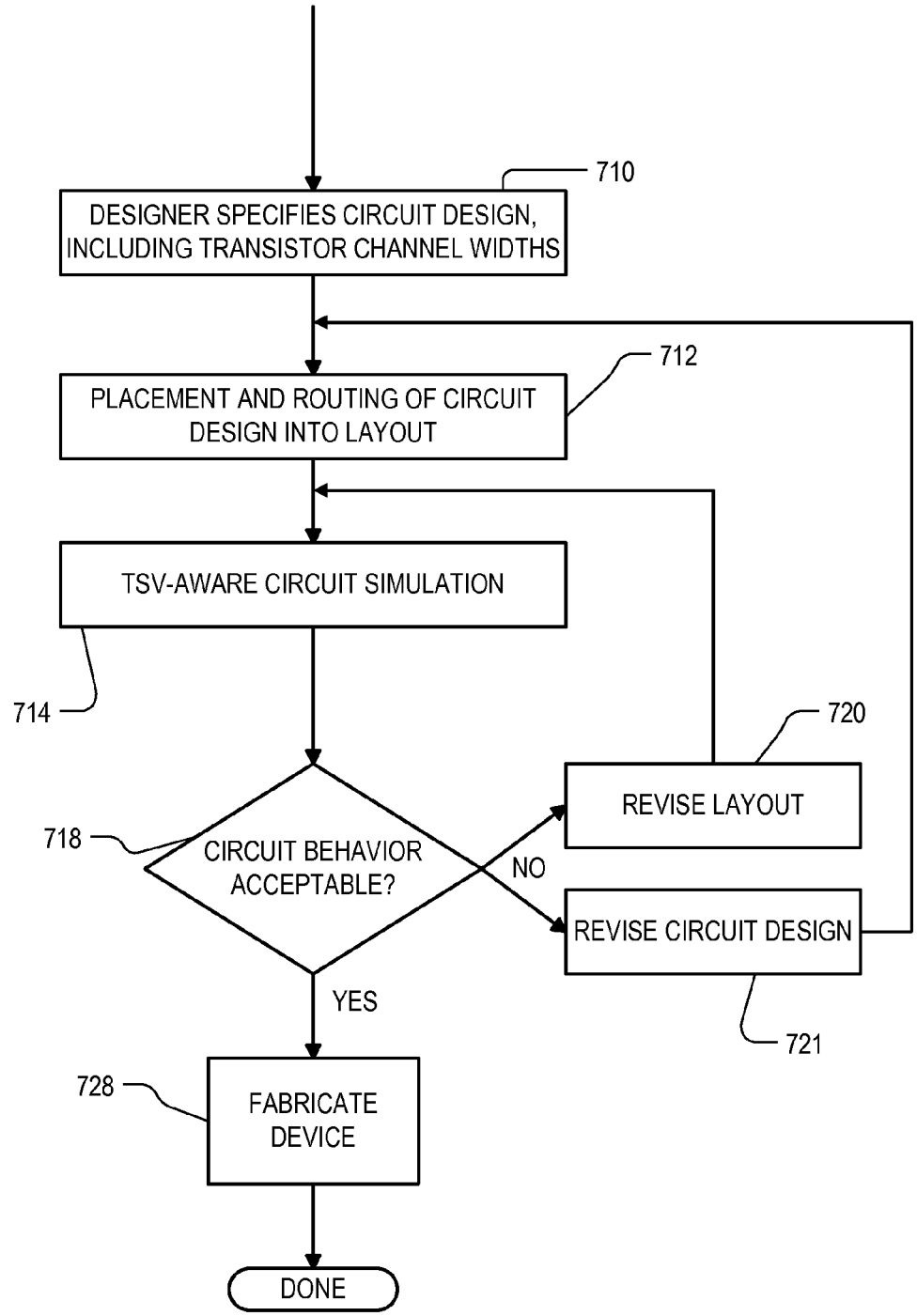
FIG. 7 is a flowchart illustrating portions of steps 100 and 112-124 of FIG. 1.

A circuit or layout that includes transistors in proximity to a TSV can be iteratively revised in order to better achieve designed characteristics. FIG. 7 is a flowchart illustrating portions of steps 100 and 112-124 (FIG. 1) involved in implementing aspects of the invention. Most of these steps can be performed by a computer system under the control of software. As with all flowcharts herein, it will be appreciated that many of the steps in FIG. 7 can be combined, performed in parallel or performed in a different sequence without affecting the functions achieved. In step 710, corresponding roughly to steps 100 and 112-120 in FIG. 1, the designer specifies a circuit design. As used herein, an "integrated circuit design" is a transistor level design, after synthesis from VHDL and before layout. A designer can "specify" an integrated circuit design either by specifying it at the transistor level, or by specifying at a higher level and manually or automatically (e.g. by a computer) converting it to the transistor level through one or more sub-steps. Additionally, a "circuit", as the term is used herein, need not be a "complete" circuit; a circuit portion is sufficient to constitute a "circuit" as the term is used herein.

For purposes of some aspects of the invention, in the integrated circuit design in step 710, the designer has already specified (explicitly or implicitly) the channel length/width (L/W) ratios desired for each transistor. Since in a typical integrated circuit technology the channel lengths of most transistors are the same, effectively the specification of L/W ratios is also a specification of the ratio that each transistor's channel width bears to every other transistor's channel width. Many factors are considered in the selection of L/W ratios, one of which is the minimum required current-carrying capacity Ion of the transistor in the ON state. In particular, it is known that, absent stress considerations, the Ion of a transistor is roughly proportional to its channel width. That is, the ratio of Ion of one transistor to that of a second transistor is roughly equal to the ratio of their channel widths. So if one transistor is required to supply twice the current for downstream circuitry that a second transistor is required to supply, then the first transistor would be assigned twice the channel width as the second transistor. Based on this principle, one can determine from the relative channel widths assigned to different transistors in an integrated circuit design, the ratios of Ion's that were intended by the designer for such transistors. Typically a design is represented in a file or database and stored on a computer readable medium accessible to the computer system. The database includes a "netlist", which is a listing of all the devices used in the circuit design and the interconnects among them. For many transistors, the netlist also specifies the transistor model to be used in SPICE simulations, and any device instance parameter values for each transistor. The device instance parameters indicate L/W among other things, but not any TSV-induced transistor performance variations.

In step 712, the circuit design undergoes "placement", and optionally "routing" as well, thereby resulting in a "layout". Step 712 corresponds roughly to part of step 122 (FIG. 1), and is performed by a computer system under software control. As used herein, a "layout" defines a set of masks that, when applied in a fabrication process, together define the physical features of the integrated circuit device. Among other things, these features can include transistor source, drain and channel regions, diffusion regions, STI regions, TSVs, and so on, and together these features define circuit structures such as the transistors specified in the integrated circuit design. The masks defined by a "layout", as that term is used herein, may (and typically do) go through one or more post-processing steps such as steps 126-130 (FIG. 1) before they are finalized for production. Although a layout typically defines masks for all of the fabrication process steps, it will be appreciated that for some aspects of the present invention the integrated circuit design need only be compiled to the point of a layout that defines fewer than all such masks. For example, for some aspects the layout need not yet define masks for the so-called "back-end" fabrication steps, such as the formation of routing and via layers. The layout is typically represented in another standard format file or database, for example using the standard GDSII format, and stored on a computer readable medium. Among other things, the layout file specifies geometries (2-dimensional shape, size, location and orientation) of various elements (including transistor features and TSVs) on various layers of a chip design.

Figure 6:
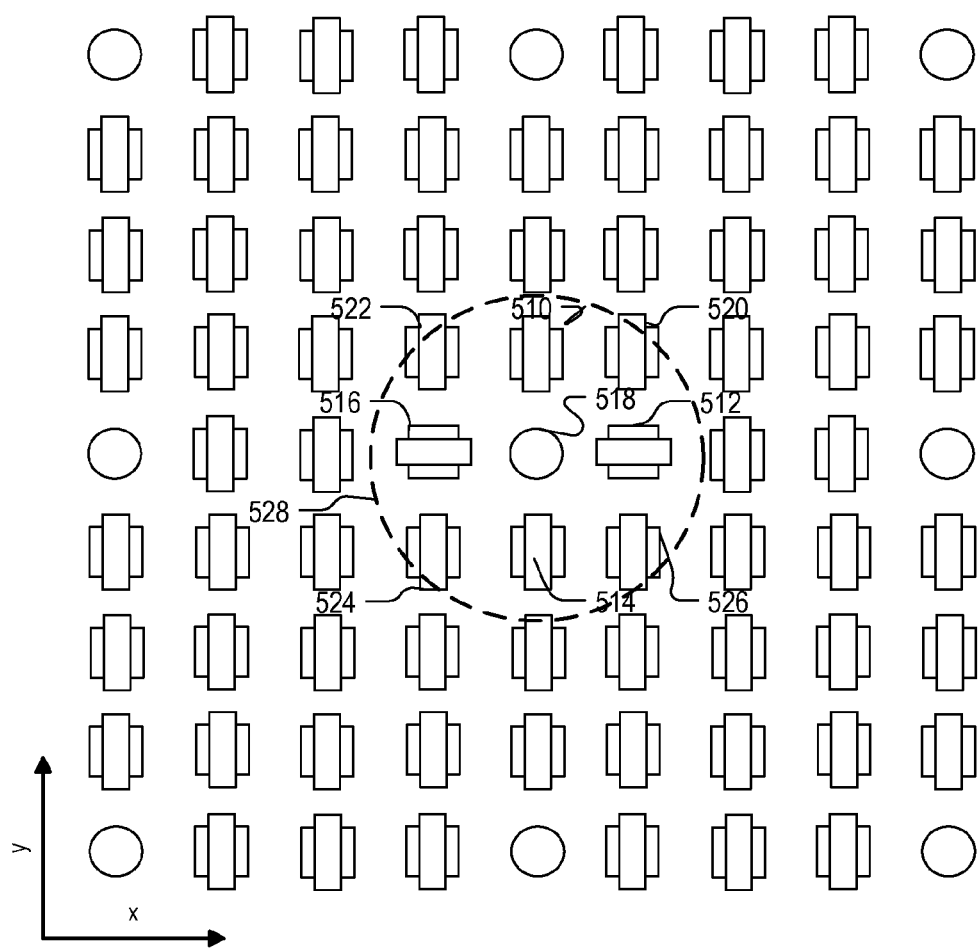
FIG. 6 is a view of the region of silicon substrate of FIG. 5, in which two transistors have been rotated.

In step 714, a TSV-aware circuit simulation is performed by a computer system in a manner described below. Desired electrical characteristics of the circuit are calculated, and in step 718 the computer system determines whether the electrical characteristics of the circuit or circuit section match target values. If not, then either the layout can be revised (step 720) or the circuit design itself can be revised (step 721). If the layout is to be revised in step 720, a number of different techniques are available to do so to account for stress modification of the performance parameter. In one embodiment these revisions can be performed manually by a designer, whereas in another embodiment they can be done automatically by a computer under software control. Even where done manually, typically the designer uses a computer to perform the revisions. In one aspect, the transistor can be moved to a different position relative to the TSV. It may, for example, be moved to a greater or lesser distance from the TSV, or moved to a different angular position relative to the TSV. In another aspect, the transistor can be rotated so that its longitudinal dimension is oriented tangentially to the TSV, or it can simply be rotated by 90 degrees as shown in FIG. 6. In yet another example, the transistor channel widths can be adjusted to better match the strength ratios intended by the designer. For example, if in a layout the channel width of a first transistor is approximately 3 times the channel width of a second transistor, it can be assumed that the designer intended the Ion for the first transistor to be 3 times that of the second transistor. This strength ratio of 3:1 is referred to herein as a target ratio, and before stress effects are taken into account, results in the 3:1 channel width ratio on the layout. The analysis in step 714, however, may indicate that actual strength ratio is significantly different than 3:1 once the TSV-induced stress effects are considered. In step 720, therefore, the designer or the computer system can either increase the channel width (i.e. the diffusion width) of one of the transistors, or decrease the channel width of the other, or a combination of both, in order to achieve the target strength ratio of 3:1.

Note that in the last-mentioned layout revision technique, often it will be insufficient to modify the channel widths of only the particular transistors being addressed. Increased channel width also causes increased capacitance, often requiring upstream driving circuitry to be strengthened to accommodate. On the other hand, decreased channel width weakens the driving ability of the transistor, which may require adjustment of downstream circuitry. Therefore, after the layout revisions are made, it is advisable to calculate new SPICE model parameters for the affected transistors and re-run the circuit simulations to ensure that the circuit still will operate as intended.

If the layout is revised (step 720), then the process returns to step 714 for a new TSV-aware simulation of the revised layout. If the circuit design itself is revised (step 721) then the procedure returns to step 712 for laying out the circuit design, or revised portion thereof, again. On the other hand, if in step 718 it is determined that circuit behavior is acceptable, then in an embodiment, that determination can be considered to constitute an output of the overall process. Preferably this output is used to authorize fabrication of a mask set and then an actual device (step 728) from the layout, and the output of the process is either the mask set or the actual device. The fabrication step 728 includes the subsequent steps of the EDA process in FIG. 1, such as analysis and extraction step 124, and so forth. As used herein, a layout revised for TSV-induced stress effects is sometimes referred to herein as having been formed "in dependence upon" each of the individual steps 712, 714, 718, 720 and 721.

Figure 8:
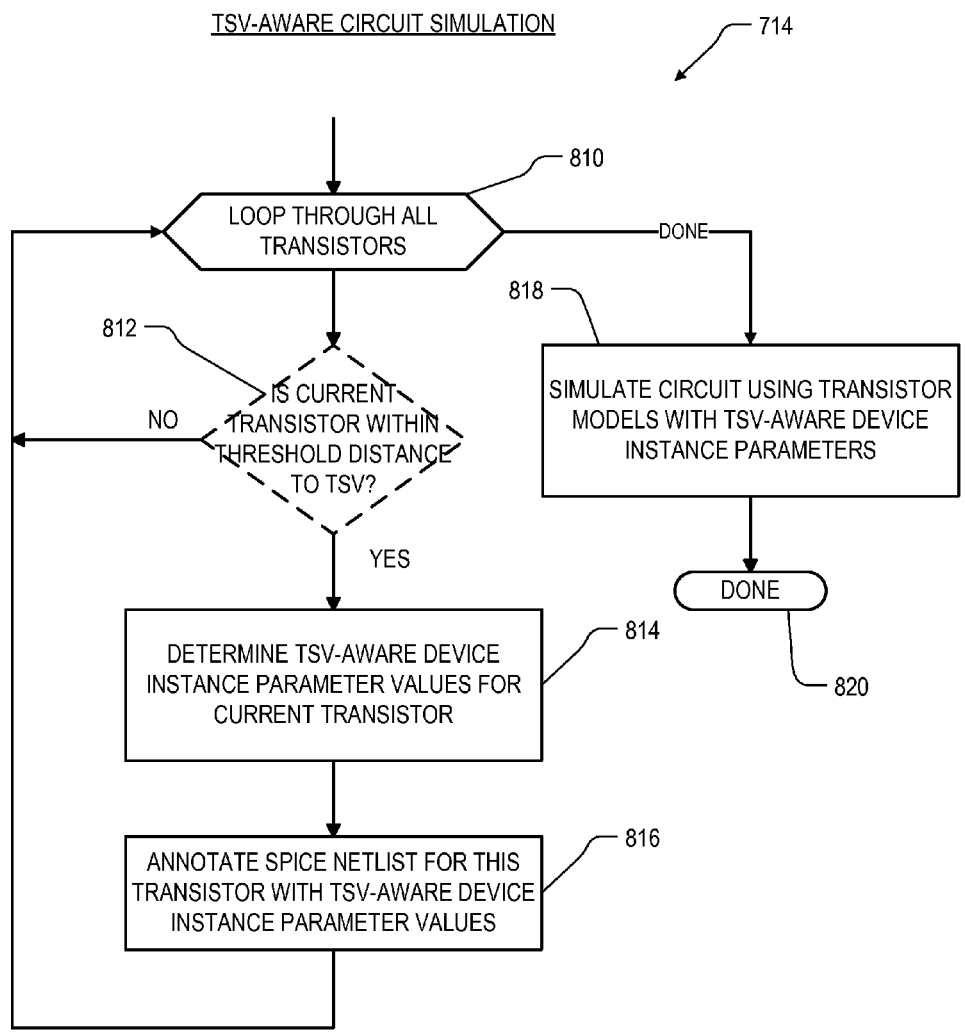
FIG. 8 is a detail of the TSV-aware circuit simulation step in FIG. 7.

FIG. 8 is a detail of the TSV-aware circuit simulation step 714 in FIG. 7. In a step 810, a loop is performed through all the transistors in the circuit or in a section of the circuit. This may be part of a much more comprehensive loop, for back-annotating a netlist for many other purposes in addition to TSV modeling. In step 812, it is determined whether the transistor is within a threshold distance to a TSV. If not, then the loop proceeds to the next transistor in the circuit (or to other steps in the loop not important for an understanding of the present invention). The threshold distance in step 812 may be predefined, such as 10 or 20 microns, and it may be larger for p-channel transistors than n-channel transistors. The threshold distance also may be made dependent upon other features such as angular position relative to the TSV. The step 812 is shown in broken lines in FIG. 8 because in one embodiment, no distance test is performed and all transistors undergo the steps following.

If the current transistor is within the threshold distance to a TSV, then in step 814, TSV-aware device instance parameter values for the current transistor are determined. These parameters may include MULU0 and/or DELVTO as described above, among others. Note that other influences on the device instance parameter values may be taken into account in this step as well, other than stresses induced due to the proximity of a TSV. As used herein, "awareness" does not preclude other influences as well. In step 816, the netlist entry for the current transistor is back-annotated with the TSV-aware device instance parameter values just determined, and the process returns to the looping step 810 to consider the next transistor.

After the loop completes, and all transistors in the circuit or desired section of the circuit have been considered and back-annotated if appropriate, then in step 818 the circuit is simulated using the back-annotated netlist, and a version of SPICE or another circuit simulator.

The step 814 of determining TSV-aware device instance parameter values for a particular transistor is performed differently depending on what TSV-induced stress resource is available in a particular embodiment. In an embodiment in which the resource reports device instance parameter values in dependence upon the position of the transistor relative to the TSV (and optionally other selection factors), this step 814 involves merely looking up the selection factors for the current transistor, providing them to the resource, and receiving the device instance parameters reported by the resource. Alternatively, in an embodiment in which the resource reports only the two- or three-dimensional stress vector at each position of the transistor relative to the TSV, the procedure of FIG. 9 may be used to determine the TSV-aware device instance parameter values for a particular transistor.

Figure 9:
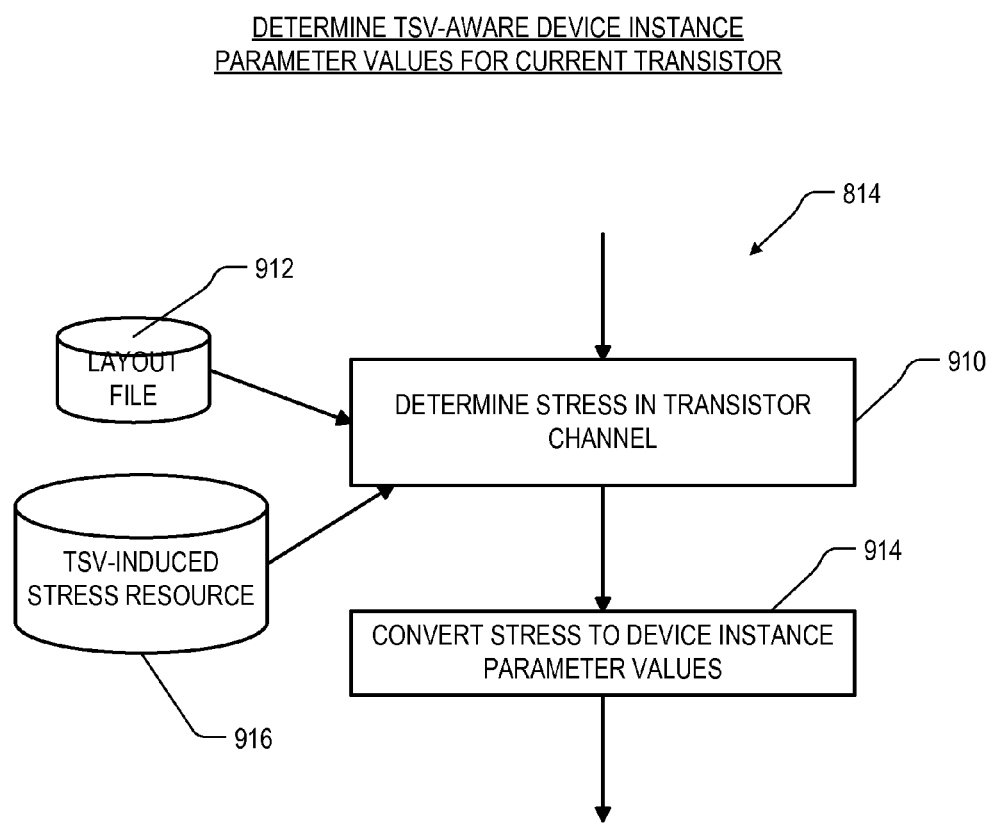
FIG. 9 is an example detail of the step in FIG. 8 of determining TSV-aware device instance parameter values for a particular transistor.

Referring to FIG. 9, in step 910, it is first determined what the stress vector is in the channel of the current transistor. This depends of course on the position, orientation, and other geometric features of the transistor and the TSV. These factors are obtained from the layout file 912. Reference is then made to the TSV-induced stress resource to determine the TSV-induced stress vector in the transistor channel, or at multiple points within the channel.

In step 914 the stress in the channel is converted to device instance parameters. Preferably but not necessarily, the conversion is accomplished using the techniques described in U.S. patent application Ser. No. 11/291,294, filed Dec. 1, 2005, entitled "Analysis of Stress Impact on Transistor Performance", incorporated by reference herein. These techniques are preferred because they can be made to operate with sufficient speed to analyze the transistors in large layout regions in multiple layout revision iterations, and with sufficient accuracy. Roughly described, the techniques involve, for each transistor to be analyzed, first selecting several sample points in the transistor's channel. The stress vector at each of the sample points is then approximated (or already known from step 910). These stress vectors can take into account not only TSV-inducted stress, but also stresses from other sources as well. From the stress vectors, the impact on a transistor characteristic of interest, such as the stress-induced change in mobility at the particular sample point, is determined. The values of these characteristics are then averaged over all the sample points in the channel to approximate the average stress-adjusted value for the entire channel, and then transformed to whatever form is required for use as device instance parameters.

TSV Macrocells

A circuit or layout that includes transistors in proximity to a TSV also can be designed in advance and provided to designers as a macrocell (which as used herein can be a standard cell). It is common for integrated circuit designers to take advantage of macrocells that have been pre-designed for particular kinds of circuits, such as logic gates, larger logic functions, memory and even entire processors or systems. These macrocells are provided in a library available from various sources, such as foundries, ASIC companies, semiconductor companies, third party IP providers, and even EDA companies, and used by designers when designing larger circuits. Each macrocell typically includes such information as a graphical symbol for schematic drawings; text for a hardware description language such as Verilog; a netlist describing the devices in the included circuit, the interconnections among them, and the input and output nodes; a layout (physical representation) of the circuit in one or more geometry description languages such as GDSII; an abstract of the included geometries for use by place-and-route systems; a design rule check deck; simulation models for use by logic simulators and circuit simulators; and so on. Some libraries may include less information for each macrocell, and others may include more. In some libraries the entries are provided in separate files, whereas in others they are combined into a single file, or one file containing the entries for multiple different macrocells. In all cases the files are either stored and distributed on a computer readable medium, or delivered electronically and stored by the user on a computer readable medium. Macrocell libraries often contain multiple versions of the same logic function differing in area, speed and/or power consumption, in order to allow designers or automated tools the option to trade off among these characteristics. A macrocell library can also be thought of as a database of macrocells. As used herein, the term "database" does not necessarily imply any unity of structure. For example, two or more separate databases, when considered together, still constitute a "database" as that term is used herein. As such, the entries defining each single macrocell can also be thought of as a "database".

During the design of an integrated circuit, typically a designer incorporates a macrocell in step 112, 114 or 116 of FIG. 1, depending on how much of the system the macrocell includes. It is then carried along through the rest of the design flow and made reference to in each of steps 118-126.

Figure 10A:
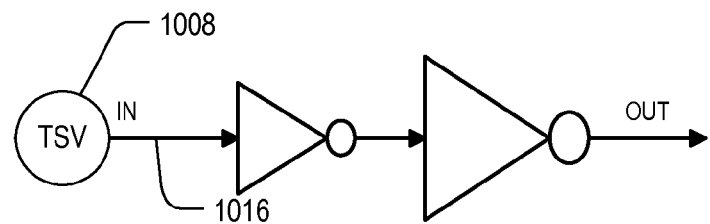
FIG. 10A illustrates the circuit symbol of an example macrocell.
Figure 10B:
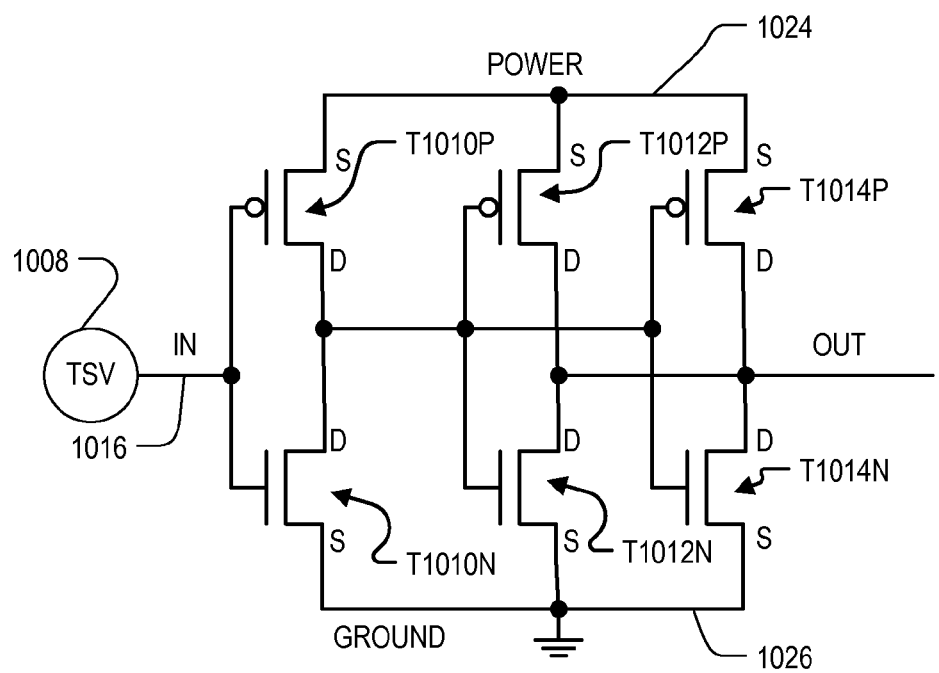
FIG. 10B is a transistor level diagram of the macrocell of FIG. 10A.
Figure 10C:
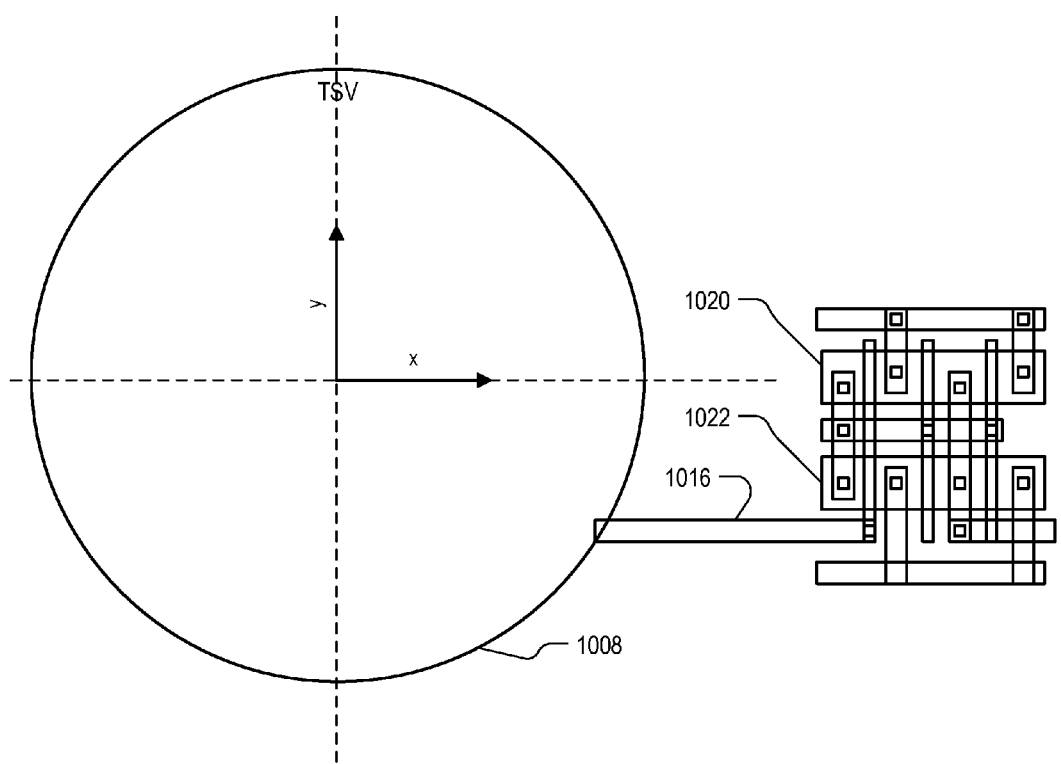
FIGS. 10C, 11, 12 and 13 illustrate various layouts of the macrocell of FIG. 10A.

Since the effect of TSV-induced stress on transistors placed in proximity to a TSV can be characterized in advance for a particular fabrication process, given the location, type and orientation of the transistor relative to the TSV, it is an aspect of the invention to include transistors and TSVs together in a single macrocell. FIGS. 10A, 10B and 10C (collectively FIG. 10) illustrate certain information in an example of a 2× input buffer that might be used to buffer an input signal from a TSV 1008 for driving circuitry on a particular wafer level of a 3D integrated device. Typically many of these buffers would be connected in parallel, but only a 2× buffer is shown herein for simplicity of description.

FIG. 10A illustrates the circuit symbol of the macrocell, and FIG. 10B is a transistor level diagram of the macrocell. As can be seen in FIG. 10B, the macrocell includes three P-channel transistors T1010P, T1012P and T1014P, and three N-channel transistors T1010N, T1012N and T1014N. The TSV 1008 is connected to the gates of both transistors T1010P and T1010N. The drains of transistors T1010P and T1010N are connected together and to the gates of transistors T1012P, T1012N, T1014P and T1014N. The drains of transistors T1012P, T1012N, T1014P and T1014N are all connected together and form the output of the 2× buffer macrocell. The sources of the three P-channel transistors T1010P, T1012P and T1014P are all connected to POWER conductor 1024, and the sources of the three N-channel transistors T1010N, T1012N and T1014N are all connected to GROUND conductor 1026.

FIG. 10C illustrates a layout of the macrocell. (All layout diagrams herein should also be considered to illustrate features present on a mask set made using the layout, and on an integrated circuit device made using the layout.) All of the P-channel transistors T1010P, T1012P and T1014P are located in a P-diffusion region 1020, and all of the N-channel transistors T1010N, T1012N and T1014N are located in an N-diffusion 1022. The transistors are all oriented parallel to the x-axis as shown in the diagram, which in the embodiment of FIG. 10 lies in a <110> direction from the TSV 1008 (the standard direction). As previously explained, however, if the transistors of the 2× buffer are too near the TSV 1008, the stresses induced into the channel regions of the transistors can alter the mobility significantly. Nevertheless, in the macrocell of FIG. 10 the transistors are located in sufficient proximity to the TSV 1008 as to change their channel carrier mobility by more than 5%. This is made possible by the fact the macrocell is also supplied with a simulation model that defines the performance parameters of the circuit in a manner that takes into account the distance of each of the transistors to the TSV. Preferably, it also takes into account the angular displacement of each transistor from the x-axis, and preferably also takes into account the orientation of each transistor relative to the x-axis. As so characterized, the macrocell can be used in a larger circuit design even though the transistors of the 2× buffer are located much more closely to the TSV 1008 than would previously have been considered wise.

Figure 11:
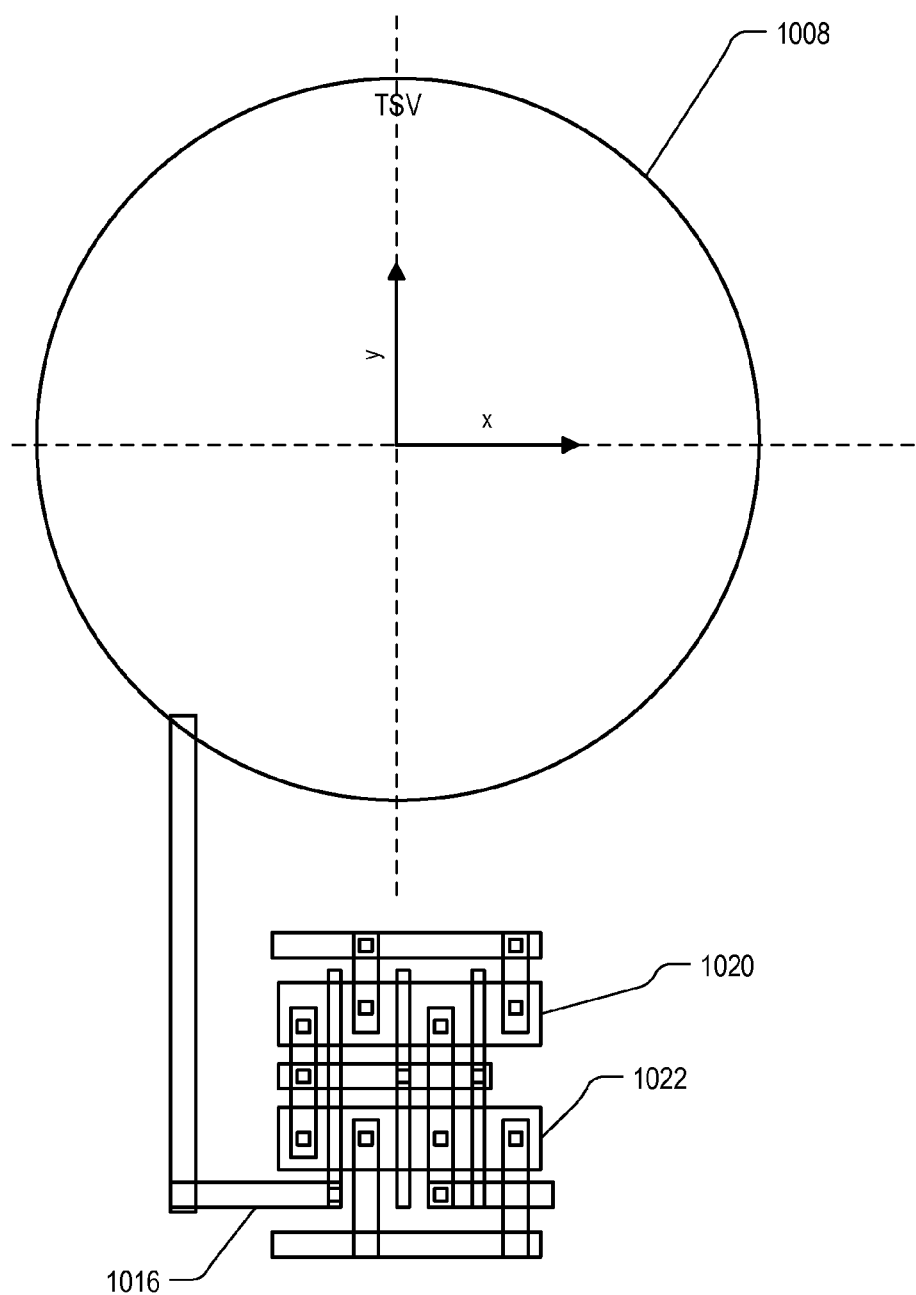
Figure 12:
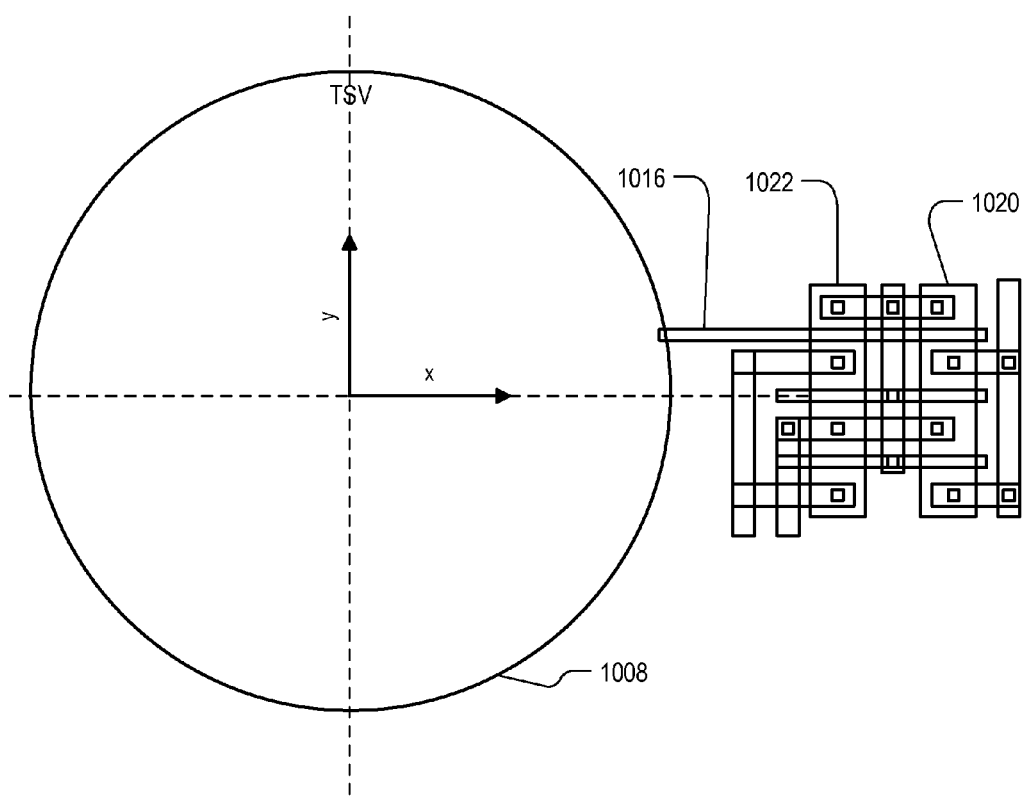
Figure 13:
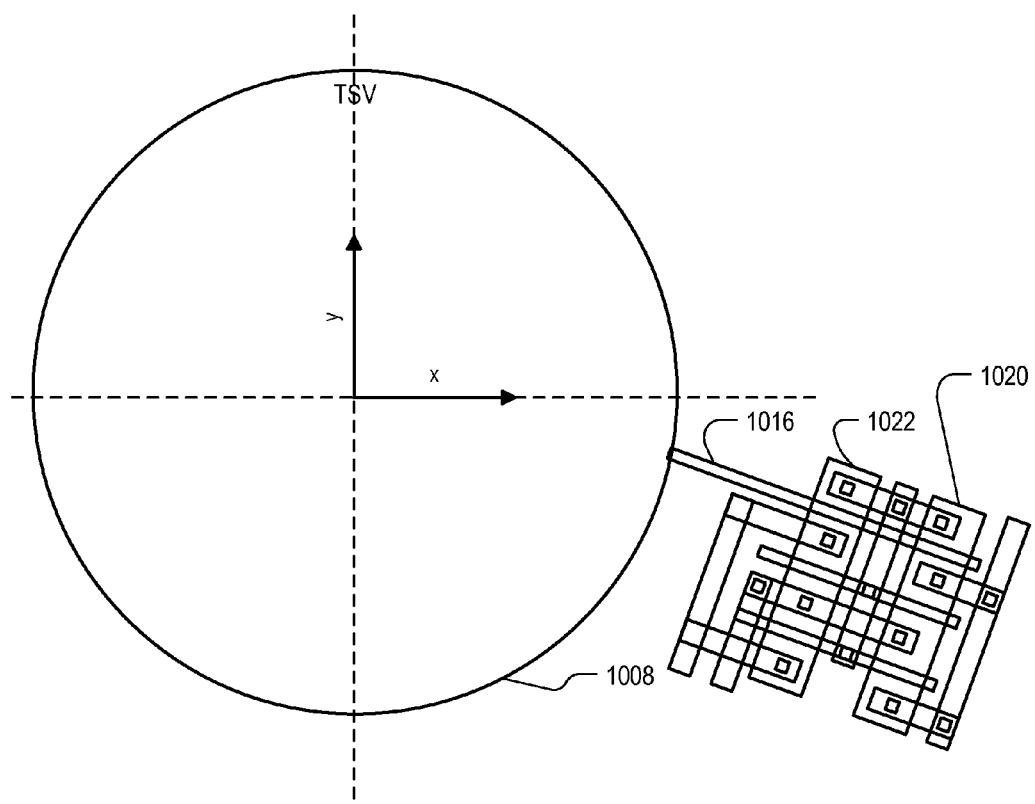

In FIG. 10C, all of the P-channel transistors T1010P, T1012P and T1014P are disposed along the x-axis and oriented longitudinally to the x-axis. As previously explained, the performance of the P-channel transistors can be improved by moving them to the y-axis. This is shown in the macrocell layout of FIG. 11. In the embodiment of FIG. 11 all the P-channel transistors are now oriented tangentially to the TSV 1008, and are disposed at an angular displacement to the x-axis at which TSV-induced compressive stress coupled into the channels is at a maximum. It can be seen that the N-channel transistors T1010N, T1012N and T1014N also have been moved into less optimal positions and orientations, but as mentioned, N-channel transistors are significantly less sensitive to the stress induced by nearby TSVs.

In FIGS. 10A-10C, and 11-13, interconnect 1016 electrically connects the TSV 1008 to the macrocell.

Also as previously explained, the performance of the P-channel transistors can be improved alternatively by rotating them in place so as to orient them tangentially to the TSV 1008. This is shown in the macrocell layout of FIG. 12. Moreover, the buffer circuitry can be disposed at any angular displacement from the x-axis, and preferably oriented tangentially (or "substantially" tangentially) as shown in the macrocell layout of FIG. 13.

Computer System

Figure 14:
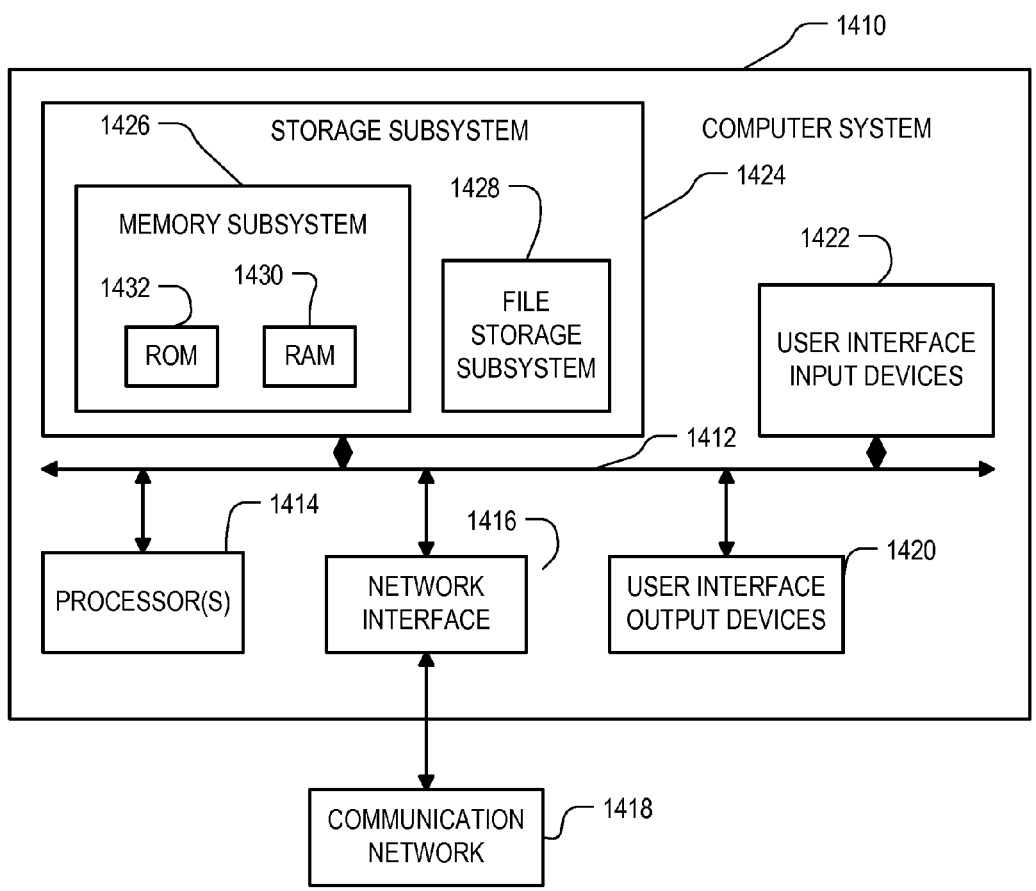
FIG. 14 is a simplified block diagram of a computer system that can be used to implement software incorporating aspects of the present invention.

FIG. 14 is a simplified block diagram of a computer system 1410 that can be used to implement software incorporating aspects of the present invention. Computer system 1410 typically includes a processor subsystem 1414 which communicates with a number of peripheral devices via bus subsystem 1412. These peripheral devices may include a storage subsystem 1424, comprising a memory subsystem 1426 and a file storage subsystem 1428, user interface input devices 1422, user interface output devices 1420, and a network interface subsystem 1416. The input and output devices allow user interaction with computer system 1410. Network interface subsystem 1416 provides an interface to outside networks, including an interface to communication network 1418, and is coupled via communication network 1418 to corresponding interface devices in other computer systems. Communication network 1418 may comprise many interconnected computer systems and communication links. These communication links may be wireline links, optical links, wireless links, or any other mechanisms for communication of information. While in one embodiment, communication network 1418 is the Internet, in other embodiments, communication network 1418 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1422 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1410 or onto computer network 1418.

User interface output devices 1420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1410 to the user or to another machine or computer system.

Storage subsystem 1424 stores the basic programming and data constructs that provide the functionality of certain aspects of the present invention. For example, the various modules implementing the functionality of a circuit simulator and computer-implemented steps in FIGS. 1 and 7-9 may be stored in storage subsystem 1424. These software modules are generally executed by processor subsystem 1414. The data constructs stored in the storage subsystem 1424 also can include any technology files, macrocell libraries, layout files, and other databases mentioned herein. Note that in some embodiments, one or more of these can be stored elsewhere but accessibly to the computer system 1410, for example via the communication network 1418.

Memory subsystem 1426 typically includes a number of memories including a main random access memory (RAM) 1430 for storage of instructions and data during program execution and a read only memory (ROM) 1432 in which fixed instructions are stored. File storage subsystem 1428 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs (or may have been communicated to the computer system 1410 via the communication network 1418), and may be stored by file storage subsystem 1428. The host memory 1426 contains, among other things, computer instructions which, when executed by the processor subsystem 1414, cause the computer system to operate or perform functions as described herein. As used herein, processes and software that are said to run in or on "the host" or "the computer", execute on the processor subsystem 1414 in response to computer instructions and data in the host memory subsystem 1426 including any other local or remote storage for such instructions and data.

Bus subsystem 1412 provides a mechanism for letting the various components and subsystems of computer system 1410 communicate with each other as intended. Although bus subsystem 1412 is shown schematically as a single bus, alternative embodiments of the bus subsystem may use multiple busses.

Computer system 1410 itself can be of varying types including a personal computer, a portable computer, a workstation, a computer terminal, a network computer, a television, a mainframe, or any other data processing system or user device. Due to the ever-changing nature of computers and networks, the description of computer system 1410 depicted in FIG. 14 is intended only as a specific example for purposes of illustrating the preferred embodiments of the present invention. Many other configurations of computer system 1410 are possible having more or less components than the computer system depicted in FIG. 14.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given value is "responsive" to a predecessor value if the predecessor value influenced the given value. If there is an intervening processing element, step or time period, the given value can still be "responsive" to the predecessor value. If the intervening processing element or step combines more than one value, the output of the processing element or step is considered "responsive" to each of the value inputs. If the given value is the same as the predecessor value, this is merely a degenerate case in which the given value is still considered to be "responsive" to the predecessor value. "Dependency" of a given value upon another value is defined similarly.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim as follows:

1. A computer readable medium storing in a non-transitory manner, data and computer instructions which when executed by a processor cause a computer system to make:
a layout for a circuit, the layout including a TSV and a first transistor electrically connected to the TSV; and
a simulation model of the circuit that takes into account a distance of the first transistor to the TSV,
wherein the first transistor is disposed in such proximity to the TSV as to change the carrier mobility in the channel of the first transistor by more than 5% compared to the carrier mobility in the absence of the TSV.

2. A medium according to claim 1, wherein the first transistor has a first angular displacement in the layout relative to a predetermined direction from the TSV,
and wherein the simulation model further takes into account the first angular displacement.

3. A medium according to claim 1, wherein the first transistor has a first orientation in the layout,
and wherein the layout further includes a second transistor having a second orientation in the layout, the second orientation being different from the first orientation.

4. A medium according to claim 1, wherein the first transistor is a P-channel transistor,
wherein the first transistor is disposed within ±45 degrees from a <110> direction from the TSV,
and wherein the first transistor is oriented in the layout substantially tangentially to the TSV.

5. A medium according to claim 4, wherein the first transistor is disposed in the <110> direction from the TSV.

6. A medium according to claim 1, wherein the first transistor is disposed in such proximity to the TSV as to change the carrier mobility in the channel of the first transistor by more than 5%.

7. A medium according to claim 1, wherein the layout has a switching speed design margin,
and wherein the first transistor is disposed in such proximity to the TSV as to change the switching speed of the first transistor by more than the switching speed design margin.

8. A computer readable medium storing in a non-transitory manner, data and computer instructions which when executed by a processor cause a computer system to make:
a circuit layout including a TSV, a first transistor electrically connected to the TSV, the first transistor having a first orientation, and a second transistor having an orientation different from the first orientation,
wherein the first transistor is disposed in such proximity to the TSV as to change the carrier mobility in the channel of the first transistor by more than 5% compared to the carrier mobility in the absence of the TSV.

9. An EDA tool on a computer readable medium, comprising:
a layout tool on a computer readable medium making a circuit design comprising:
a first transistor having a channel and having a carrier mobility in the channel; and
a TSV causing stress in a substrate, the TSV being disposed in such proximity to the first transistor as to change the carrier mobility in the channel of the first transistor by more than 5% compared to the carrier mobility in the absence of the TSV.

10. The EDA tool according to claim 9, wherein the first transistor comprises at least part of a digital logic circuit.

11. The EDA tool according to claim 9, wherein the first transistor includes a source region, a drain region and a gate,
and wherein one of the source region, drain region and gate of the first transistor is connected electrically to the TSV.

12. The EDA tool according to claim 9, wherein the first transistor has a first orientation on the substrate,
and wherein the device further includes a second transistor having a second orientation on the substrate, the second transistor being disposed in such proximity to the TSV as to change the carrier mobility in the channel of the second transistor by more than 5% compared to the carrier mobility of the second transistor in the absence of the TSV,
wherein the second orientation is different from the first orientation.

13. The EDA tool according to claim 9, wherein the first transistor is a P-channel transistor,
wherein the first transistor is disposed within ±45 degrees from a <110> direction from the TSV, and wherein the first transistor is oriented substantially tangentially to the TSV.

14. The EDA tool according to claim 13, wherein the first transistor is disposed in the <110> direction from the TSV.

15. The EDA tool according to claim 9, wherein the first transistor is a P-channel transistor,
wherein all P-channel transistors that are disposed in such proximity to the TSV as to change their channel carrier mobility by more than 5% compared to their respective carrier mobilities in the absence of the TSV, are oriented substantially tangentially to the TSV.

16. An EDA tool on a computer readable medium, comprising:
a layout tool on a computer readable medium making a circuit design comprising:
a TSV causing stress in a substrate; and
a first transistor disposed in such proximity to the TSV as to change a switching speed of the first transistor, compared to the switching speed of the first transistor in the absence of the TSV, by more than the switching speed design margin.

17. The EDA tool according to claim 16, wherein the first transistor comprises at least part of a digital logic circuit.

18. The EDA tool according to claim 16, wherein the first transistor includes a source region, a drain region and a gate,
and wherein one of the source region, drain region and gate of the first transistor is connected electrically to the TSV.

19. The EDA tool according to claim 18, wherein the first transistor has a first orientation on the substrate,
and wherein the device further includes a second transistor having a second orientation on the substrate, the second transistor being disposed in such proximity to the TSV as to change the carrier mobility in the channel of the second transistor, compared to the switching speed of the second transistor in the absence of the TSV, by more than the switching speed design margin,
wherein the second orientation is different from the first orientation.

20. The EDA tool according to claim 16, wherein the first transistor has a first orientation on the substrate,
and wherein the device further includes a second transistor having a second orientation on the substrate, the second transistor being disposed in such proximity to the TSV as to change the carrier mobility in the channel of the second transistor, compared to the switching speed of the second transistor in the absence of the TSV, by more than the switching speed design margin,
wherein the second orientation is different from the first orientation.

21. The EDA tool according to claim 16, wherein the first transistor is a P-channel transistor,
wherein the first transistor is disposed within ±45 degrees from a <110> direction from the TSV,
and wherein the first transistor is oriented substantially tangentially to the TSV.

22. The EDA tool according to claim 21, wherein the first transistor is disposed in the <110> direction from the TSV.

23. The EDA tool according to claim 16, wherein the first transistor is a P-channel transistor,
wherein all P-channel transistors that are disposed in such proximity to the TSV as to change their channel carrier mobility by more than the switching speed design margin compared to their respective switching speeds in the absence of the TSV, are oriented substantially tangentially to the TSV.

24. The EDA tool according to claim 16, wherein the first transistor is disposed in such proximity to the TSV as to change the switching speed of the first transistor by more than 5% compared to the switching speed in the absence of the TSV.

25. An EDA tool on a computer readable medium, comprising:
a layout tool on a computer readable medium making a circuit design comprising a TSV causing stress in a substrate and a first transistor,
the layout tool permitting rotation of the first transistor to cause longitudinal axes of the TSV and the first transistor to coincide.

* * * * *